US012760834B2

(12) United States Patent
Xiao

(10) Patent No.: US 12,760,834 B2
(45) Date of Patent: Oct. 13, 2026

(54) PORTABLE TRIPOD

(71) Applicant: Zongwang Xiao, Shenzhen (CN)

(72) Inventor: Zongwang Xiao, Shenzhen (CN)

(73) Assignee: Zongwang Xiao, Shenzhen (CN)

( * ) Notice: Subject to any disclaimer, the term of this patent is extended or adjusted under 35 U.S.C. 154(b) by 128 days.

(21) Appl. No.: 18/917,767

(22) Filed: Oct. 16, 2024

(65) Prior Publication Data

US 2025/0035259 A1 Jan. 30, 2025

Related U.S. Application Data

(63) Continuation of application No. PCT/CN2023/087188, filed on Apr. 9, 2023.

(30) Foreign Application Priority Data

Apr. 29, 2022 (CN) ........................ 202210475046.3

(51) Int. Cl.
*F16M 11/34* (2006.01)
*F16M 11/16* (2006.01)
*F16M 11/28* (2006.01)

(52) U.S. Cl.
CPC ............ *F16M 11/34* (2013.01); *F16M 11/16* (2013.01); *F16M 11/28* (2013.01)

(58) Field of Classification Search
CPC ......... F16M 11/34; F16M 11/16; F16M 11/28
See application file for complete search history.

(56) References Cited

U.S. PATENT DOCUMENTS

| | | | | |
|---|---|---|---|---|
| 3,836,986 | A * | 9/1974 | Kawazoe | F16M 11/16 396/419 |
| 9,004,419 | B2 * | 4/2015 | Nakatani | F16M 11/2014 248/178.1 |
| 9,017,181 | B2 * | 4/2015 | Evans | A63B 57/40 248/170 |
| 9,417,508 | B2 * | 8/2016 | Yang | F16M 11/32 |
| 10,234,071 | B2 * | 3/2019 | Bosnakovic | F16M 11/28 |

(Continued)

FOREIGN PATENT DOCUMENTS

| | | |
|---|---|---|
| CN | 208348849 U | 1/2019 |
| CN | 209622399 U | 11/2019 |

(Continued)

OTHER PUBLICATIONS

International Search Report.

*Primary Examiner* — Monica E Millner
(74) *Attorney, Agent, or Firm* — JEEN IP LAW, LLC

(57) ABSTRACT

A portable tripod, comprising: a connecting assembly (2), first to third supporting legs (1), and a middle shaft tube (4). At least one supporting foot (3) is embedded into each of the first to third supporting legs (1), and the first to third supporting legs (1) and the supporting feet (3) respectively in the supporting legs can be folded inwards to form a compact hollow cylinder. The middle shaft tube (4) is embedded into the connecting assembly (2), the first to third supporting legs (1) and the supporting feet (3) respectively in the supporting legs can be folded inwards to form the compact hollow cylinder that can compactly match the middle shaft tube (4), and the portable tripod is small in overall size after being stored and portable, and can be put into a pocket.

19 Claims, 15 Drawing Sheets

(56) References Cited

U.S. PATENT DOCUMENTS

| | | | | |
|---|---|---|---|---|
| 10,330,245 | B2 * | 6/2019 | Meuret | F16M 11/34 |
| 10,514,278 | B1 * | 12/2019 | Becker | G01D 11/30 |
| 10,982,806 | B2 * | 4/2021 | Jankura | F16M 11/16 |
| 11,221,544 | B1 * | 1/2022 | York | F16M 11/24 |
| 11,480,290 | B2 * | 10/2022 | Johnson, Sr. | F16M 11/28 |
| 11,953,145 | B2 * | 4/2024 | Zahariev | F16B 7/1463 |
| 12,085,415 | B2 * | 9/2024 | Gabbard | G01D 11/30 |
| 2009/0250567 | A1 * | 10/2009 | Raynaud | F16M 11/16 248/168 |
| 2014/0301730 | A1 * | 10/2014 | Johnson | F16M 11/06 396/428 |
| 2017/0146891 | A1 * | 5/2017 | Chen | G03B 17/561 |
| 2020/0363008 | A1 | 11/2020 | Jankura et al. | |
| 2022/0290801 | A1 * | 9/2022 | Gearing | F16M 11/14 |

FOREIGN PATENT DOCUMENTS

| | | | |
|---|---|---|---|
| CN | 213513013 | U | 6/2021 |
| CN | 214119554 | U | 9/2021 |
| CN | 214369058 | U | 10/2021 |
| CN | 114763871 | A | 7/2022 |
| CN | 217329262 | U | 8/2022 |
| WO | 2020058981 | A1 | 3/2020 |

* cited by examiner

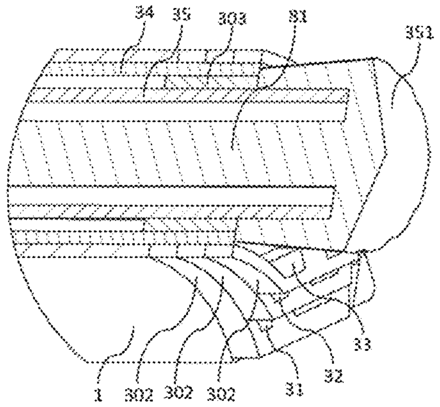
FIG. 27
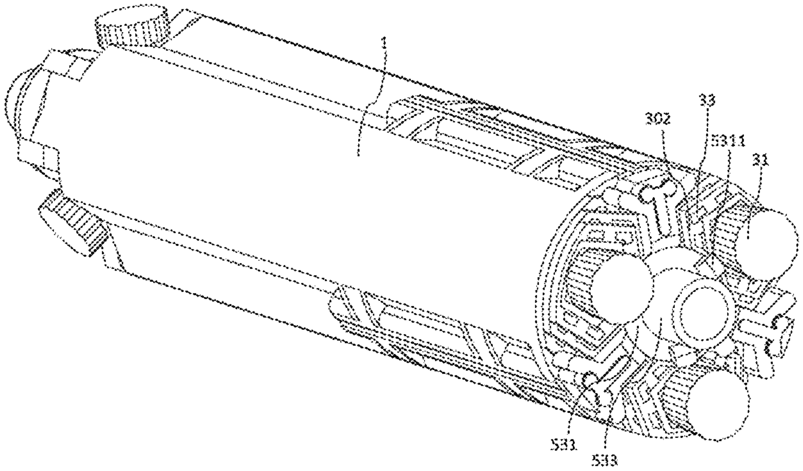
FIG. 28A
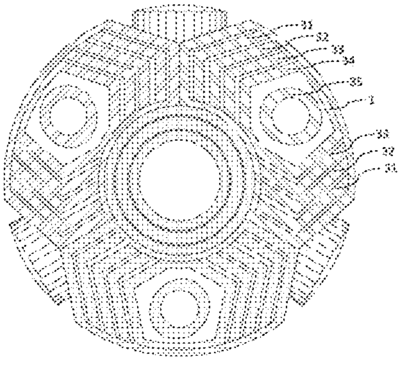
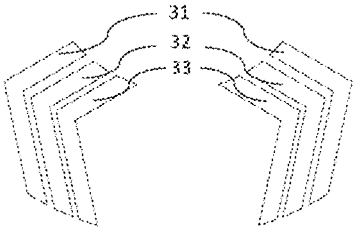
FIG. 28B
FIG. 28C

PORTABLE TRIPOD

BACKGROUND

1. Technical Field text

The present disclosure relates to a tripod, in particular to a portable tripod. The present disclosure relates to a tripod, in particular to a portable tripod.

2. Background Information

The tripod is a commonly used supporting structure known traditionally, and three supporting legs are used to provide a stable and reliable supporting platform for other equipment. The most common application is that the tripod is used as a support for equipment such as cameras, but the tripod also has many potential applications. For example, the tripod can also be used to support a laser aiming instrument for surveying, a camera for photography, a telescope for sky observation, and so on.

BRIEF SUMMARY

Technical Problems

For the sake of easy carrying, the tripod is generally of a folded structure. However, in the prior art, there is a large interval between the three supporting legs and the middle shaft tube after the tripod is folded. Therefore, the folded tripod is still very large in size and is still inconvenient to carry.

Technical Solutions

In order to overcome the disadvantages in the prior art, the present disclosure provides a portable tripod small in size.

In order to achieve the above-mentioned purpose, the present disclosure adopts the following technical scheme.

A portable tripod includes a connecting assembly, a first to third supporting feet and a middle shaft tube. A head end of the supporting leg is rotatably connected with the connecting assembly. At least one supporting foot is embedded into each of the three supporting legs. The three supporting legs and the supporting feet respectively in the supporting legs can be folded inwards to form a compact hollow cylinder. The middle shaft tube is embedded into the connecting assembly. The three supporting legs and the supporting feet respectively in the supporting legs can be folded inwards to allow the middle shaft tube to compactly combine with each other for the formation of the compact hollow cylinder. The space shape of the hollow cylinder described herein is matched with the middle shaft tube. The space utilization ratio of the three supporting legs and the middle shaft tube is maximized after the tripod is stored, so that the tripod is very compact. Therefore, the portable tripod in the embodiment of the present disclosure is small in size after being stored and is very portable.

Preferably, the middle shaft tube of the supporting leg is in the shape of a ⅓ hollow ring. Thus, three such supporting legs and the middle shaft tube can form a compact space.

Preferably, the supporting leg includes a pair of side walls, an upper arc-shaped wall and a lower arc-shaped wall, and the pair of side walls, the upper arc-shaped wall and the lower arc-shaped wall are encircled to form an annular tube body. Thus, three such supporting legs and the middle shaft tube can form a compact space.

Further, in order to enhance the structural strength of the supporting legs and the supporting feet embedded into the supporting legs, the side walls of the supporting leg include an upper side wall and a lower side wall, and each pair of side walls are encircled in pairs in opposite directions to form the shape of a “bracket”. In the present disclosure, the shape of a “bracket” can be a similar shape of “( )”, a similar shape of “< >” or other variants. Upper and lower openings in the shape of a “bracket” are smaller than the maximum diameter inside the shape of a “bracket”, so the supporting leg and the supporting foot embedded into the supporting leg cannot be separated from the side walls when being stretched.

Optionally, every two adjacent lower side walls are matched with each other in pairs after the three supporting legs are folded inwards. At this time, the space utilization rate is the highest.

Optionally, according to different requirements and in order to reduce the weight, every two adjacent lower side walls are arranged at a certain interval after the three supporting legs are folded inwards.

Preferably, the connecting assembly includes a connecting base, a locking knob and a locking ring. The connecting base is internally in the shape of a circular ring. Three outward protruding base heads and at least one locking threaded hole are arranged outside the connecting base. The locking threaded hole is in threaded connection with the locking knob. The locking ring is coaxial to the connecting base. The head end of the supporting leg includes a connector, and the connector is rotatably connected with the base head. It is understandable that in the machinery field, the connector and the base head are rotatably connected in many manners. For example, a coaxial base shaft hole is respectively formed in both sides of the base head. The base shaft hole is internally provided with a base shaft. A connecting hole is formed in the interior of the connector. The connecting hole in the interior of the connector is coaxial to the base shaft hole. The base shaft passes through the connecting hole in the interior of the connector and the base shaft hole so that head ends of the three supporting legs are rotatably connected with the connecting base. Examples are not given in detail herein. The middle shaft tube is embedded into the connecting assembly. The middle shaft tube can be immovably fixed in the connecting assembly, and also can move in the connecting assembly fixed at different positions. The locking ring includes a locking bulge, a locking half-opening and a locking full-opening. The locking bulge is coaxial to the locking threaded hole. When the middle shaft tube needs to move up and down, the locking knob is loosened, and then the middle is moved up and down to a required position. The locking knob is screwed down. At this time, the locking knob can extrude the locking bulge inward. The locking ring is tightened, and the middle shaft tube is fixed immovably. There are still many ways to realize the fixation of the connecting assembly and the middle shaft tube, and examples are not given in detail herein.

Preferably, in order to stabilize the tripod, the portable tripod also includes a support fixing device. The support fixing device includes three pairs of support rails, three pairs of support rods and support connectors. The three pairs of support rails are mounted at lower ends of the two upper side walls of the three supporting legs respectively. The three pairs of support rods are slidably mounted on the three pairs of support rails respectively, and at least one end of the support rod is not separated from the support rail. The other ends of the three pairs of support rods are rotatably mounted on the support connectors respectively. Those skilled in the art easily realize that there are many ways to mount the three pairs of support rails at the lower ends of the two upper side walls of the three supporting legs, such as direct bonding with strong glue, or inserting by a physical structure with a bolt method. In addition, the three pairs of support rails can also be directly integrally formed with the lower ends of the two upper side walls of the three supporting legs, so examples are not given in detail herein.

Further, a cylindrical cavity is formed inside of the support rail. For the purpose that the tripod can be fixed at different opening angles, a strip opening with a width of smaller than the diameter of the cylindrical cavity is formed outside of the support rail. The strip opening is suitably matched with the support rod. That is, when the tripod is unfolded, one end of the support rod can be fixed at different positions of the support rail, and then different angles are realized. The bulges can prevent one end of the support rod from sliding up and down after being fixed.

Further, the support connector includes a support tray and three claws. The three claws are arranged outside the support tray, and every two claws has an included angle of 120 degrees. Two openings with an included angle of 120 degrees are formed in a tail end of the claw. A spherical cavity is formed inside of the opening. Protruding balls are arranged at both ends of the support rod. The spherical cavity is suitably rotatably connected with the protruding ball at the other end of the support rod. In order to prevent the protruding ball at the other end of the support rod from falling off, the ball diameter of the protruding ball is larger than the width of the opening, and the protruding ball at the other end of the support rod can rotate up and down at the spherical cavity along the opening.

In a further scheme, the support connector also includes a support shaft. A hollow hole is formed coaxially with-formed coaxially with the support tray. An upper end of the support shaft is of a screw structure. The upper end of the support shaft is in threaded connection with a lower end of the middle shaft tube to play a fixing role. Around the midponit of the support shaft is rotatably connected with the hollow hole formed coaxially with the support tray. An annular clamping slot is formed in Around the midponit of the support shaft. The annular clamping slot restricts the support shaft from moving up and down. That is, the support shaft can perform rotational movement only. The lower end of the support shaft is provided with a clamping shaft and a round top. The lower end of the support shaft can be connected with a mounting hole beneath a tripod head through the clamping shaft and the round top. Therefore, the lower end of the support shaft is provided with the clamping shaft and the round top, so that the usage scenarios of the tripod are expanded. For example, a camera can be used for inverted shooting at a low angle.

Further, the support tray also includes a clamping bulge. In the embodiment, the support of the portable tripod is in a stored state, and the clamping bulge is matched with the supporting leg to prevent the supporting leg from sliding out.

Preferably, the support rail is of certain elasticity, so that one end of the support rod can smoothly pass through the bulges on both sides of the strip opening in the lower end of the support rail when sliding up and down. One end of the support rod can be fixed without artificial external force by the bulges.

Optionally, the middle shaft tube is a single tube. For ease of quick loading and unloading of the tripod head, an upper end of the middle shaft tube is provided with a clamping shaft and a round top. A threaded hole is formed in a lower end of the middle shaft tube, and the middle shaft tube can be connected with the mounting hole beneath a tripod head through the clamping shaft and the round top.

Optionally, in order to lengthen the length of the middle shaft tube, at least one middle shaft sleeve sleeves the middle shaft tube internally. The middle shaft tube and the middle shaft sleeve are adjacent in pairs and telescopically connected. A threaded hole is formed in a lower end of the middle shaft sleeve. An upper end innermost of the middle shaft sleeve is provided with a clamping shaft and a round top. Innermost of the middle shaft sleeve is connected with a mounting hole beneath a tripod head through the clamping shaft and the round top. Therefore, on one hand, the overall height of the entire tripod can be lengthened by a plurality of sleeves embedded into the middle shaft tube. On the other hand, the middle shaft tube can be used as a selfie stick alone when the middle shaft tube is disassembled, or the middle shaft tube is not disassembled, and the three supporting legs are used as handles and the middle shaft tube is used as a selfie stick when the tripod is stored.

Preferably, n supporting feet are embedded into the supporting leg in sequence, and n is a positive integer of larger than or equal to 3.

Further, a limit hole is formed in a tail end of the supporting leg. Head ends of the first to (n-1)-th supporting feet are provided with a locating hole and a locating device respectively. The locating device includes a base, a locating spring, locating shafts and a locating rail. The locating rail is mounted in the base and coaxial to the locating hole. The locating spring is arranged at the middle part inside the locating rail. The locating shafts are arranged on both sides of the locating spring respectively. The locating shaft can move on the locating rail and is coaxial to the locating hole. The middle part of the locating shaft is provided with a protruding fixture block. Of course, the locating rail can also be integrally formed with the base, or even the base and the head end of the supporting foot can also be integrally formed. In addition, the base plays a role in fixedly connecting the head ends of the first to (n-1)-th supporting feet at the same time.

Tail ends of the first to (n-2)-th supporting feet are provided with a limit hole and a fixed ring respectively. The fixed rings are fixedly mounted at the tail ends of the first to (n-2)-th supporting feet. The fixed ring plays a role in fixedly connecting the tail ends of the first to (n-2)-th supporting feet. When the first supporting foot is stretched, the locating shaft of the first supporting foot enters into the limit hole in the tail end of the supporting leg 1 under the effect of the locating spring. At this time, the locating shaft of the first supporting foot gets stuck by the limit hole in the tail end of the supporting leg 1. The first supporting foot is fixed and cannot be stretched again. When the second to (n-1)-th supporting feet are stretched out, the corresponding locating shaft enters into the corresponding locating hole under the effect of the corresponding locating spring. For example, the locating shaft of the second supporting foot enters into the locating hole of the first supporting foot under the effect of the locating spring of the second supporting leg. At this time, the locating shaft of the second supporting leg gets stuck by the limit hole of the first supporting leg. The second supporting foot is fixed and cannot be stretched again. At the same time, the fixed ring at the tail end of the first supporting foot plays a role in stabilizing the first and second supporting feet. The stretching processes of the third to (n-1)-th supporting feet and the effects of the corresponding fixed rings are analogized in sequence, and are not described in detail any more. A tail end of the (n-1)-th supporting foot is provided with a limit ring. The limit ring can prevent the head end of the n-th supporting foot from being separated from the tail end of the (n-1)-th supporting foot. An unlocking hole is formed in the base at head ends of the second to (n-1)-th supporting feet, and the unlocking holes in the bases at the head ends of the second to (n-1)-th supporting feet are matched with the protruding fixture blocks at the middle parts of the locating shafts at the head ends of the first to (n-2)-th supporting feet respectively. A head end of the n-th supporting foot is provided with an unlocking block, an unlocking hole is formed in the unlocking block, and the unlocking hole in the unlocking block is suitably matched with the protruding fixture block at the middle part of the locating shaft at the head end of the (n-1)-th supporting foot. The n-th supporting foot is provided with a fastening device, and the fastening device is suitably matched with an inner wall of the (n-1)-th supporting foot. That is, the n-th supporting foot can be tightly fixed together with the inner wall at any position of the (n-1)-th supporting foot through the fastening device. A tail end of the n-th supporting foot is provided with a foot cap.

Further, in order to save limited space, the transverse sections of the first to (n-2)-th supporting feet are in the shape of a "bracket". That is, the first to (n-2)-th supporting feet consist of a pair of supports with the transverse sections in the shape of a "bracket".

In a further scheme, all "brackets" with the transverse sections in the shape of a "bracket" of the first to (n-2)-th supporting feet are the same in heights. That is, the heights of the "brackets" do not need to be decreased layer by layer like the diameter of the circular sleeve, so the strength of each supporting foot can be ensured to the maximum extent. In addition, the height refers to the height of a single "bracket". The widths on both sides of the first to (n-2)-th supporting feet are decreased layer by layer, so two adjacent supporting feet can be embedded together.

Further, the (n-1)-th supporting foot is tubular, but the transverse sections on both sides of the (n-1)-th supporting foot are still in the shape of a "bracket". Thus, the strength of the (n-1)-th supporting foot can be enhanced.

Under the description, one end, close to the connecting assembly, of each of all supporting legs and all supporting feet is called as a head end, and the other ends are called as tail ends. When n is equal to 3, the first to (n-2)-th supporting feet indicate the first supporting foot, and the second to (n-2)-th supporting feet indicate the second supporting foot.

In an optional scheme, n supporting feet are embedded into the supporting leg in sequence, and n is equal to 2. That is, two supporting feet are embedded into the supporting leg 1 in sequence.

Further, a limit hole is formed in a tail end of the supporting leg. A head end of the first supporting foot is provided with a locating hole and a locating device respectively. The locating device includes a base, a locating spring, locating shafts and a locating rail. The locating rail is mounted in the base and coaxial to the locating hole. The locating spring is arranged at the middle part inside the locating rail. The locating shafts are arranged on both sides of the locating spring respectively. The locating shaft can move on the locating rail and is coaxial to the locating hole. The middle part of the locating shaft is provided with a protruding fixture block.

When the first supporting foot is stretched, the locating shaft enters into the limit hole under the effect of the locating spring. At this time, the locating shaft of the first supporting foot gets stuck by the limit hole in the tail end of the supporting leg. The first supporting foot is fixed and cannot be stretched again. A tail end of the first supporting foot is provided with a limit ring. The limit ring can prevent the head end of the n-th supporting foot from being separated from the tail end of the (n-1)-th supporting foot. A head end of the n-th supporting foot is provided with an unlocking block, an unlocking hole is formed in the unlocking block, and the unlocking hole in the unlocking block is suitably matched with the protruding fixture block at the middle part of the locating shaft at the head end of the (n-1)-th supporting foot.

The n-th supporting foot is provided with a fastening device, and the fastening device is suitably matched with an inner wall of the (n-1)-th supporting foot. That is, the n-th supporting foot can be tightly fixed together with the inner wall at any position of the (n-1)-th supporting foot through the fastening device. A tail end of the n-th supporting foot is provided with a foot cap.

Further, the (n-1)-th supporting foot is tubular.

In an optional scheme, n supporting feet are embedded into the supporting leg, and n is equal to 1. That is, one supporting foot 3 is embedded into the supporting leg 1. A tail end of the supporting leg is provided with a limit ring. The n-th supporting foot is provided with a fastening device, and the fastening device is suitably matched with an inner wall of the supporting leg. A tail end of the n-th supporting foot is provided with a foot cap.

In an above-mentioned optional scheme and/or an optional scheme, the fastening device includes a fastening shaft, a fastening spring and a fastening head. The middle part of the fastening shaft is provided with a protruding clamp ring. One end of the fastening head is convexly provided with two elastic clamping pieces. A circular hole is formed coaxially with the fastening head. A circular hole is formed coaxially with the unlocking hole.

The n-th supporting foot is embedded into the fastening shaft, and the fastening shaft can move and rotate inside the n-th supporting foot. The foot cap is fixedly connected with one end of the fastening shaft. The other end of the fastening head is fixedly connected with a head end of the n-th supporting foot. The other end of the fastening shaft is rotatably connected with the circular hole in the center of the unlocking block. The fastening spring is embedded into the fastening shaft. One end of the fastening spring is fixed to the protruding clamp ring, and the other end of the fastening spring is fixed to the other end of the fastening head. The fastening spring is always in a stretched state. The outer side of the unlocking block is slidably matched with the two elastic clamping pieces. When the outer side of the unlocking block slides to tail ends of the two elastic clamping pieces, the elastic clamping pieces are fastened and extruded with the inner wall of the (n-1)-th supporting foot. That is, the n-th supporting foot is fixed without moving at this time. When the outer side of the unlocking block slides to head ends of the two elastic clamping pieces, the elastic clamping pieces can slide with the inner wall of the (n-1)-th supporting foot easily. Thus, the movement of the n-th supporting foot at any position on the inner wall of the (n-1)-th supporting foot is realized. That is to say, the n-th supporting foot and the (n-1)-th supporting foot can be adjusted at different supporting heights, so that the applicability of the tripod is improved.

In an above-mentioned optional scheme and/or an optional scheme, there is still another implementation way to realize the fastening device of the n-th supporting foot. That is, the fastening device of the n-th supporting foot can be directly realized by designing the n-th supporting foot as a slightly elliptical tube body and arranging a slightly elliptical limit ring at the tail end of the (n-1)-th supporting foot. The slightly elliptical tube body of the n-th supporting foot and the slightly elliptical limit ring arranged at the tail end of the (n-1)-th supporting foot can rotate left and right to complete locking fastening fit or unlocking sliding fit. In order to complete unlocking for the (n-1)-th supporting foot, a circular hole is formed coaxially with the unlocking block, and the head end of the n-th supporting foot is rotatably connected with the circular hole in the center of the unlocking block.

Further, the foot cap is internally provided with a clamping bulge. A groove is formed in the tail end of the n-th supporting foot. The fastening spring is always in a stretched state. When the outer side of the unlocking block slides to the tail ends of the two elastic clamping pieces, the clamping bulge is in tight fit with the groove in the tail end of the n-th supporting foot. When the outer side of the unlocking block slides to the head ends of the two elastic clamping pieces, the clamping bulge inside the foot cap is disengaged from the groove in the tail end of the n-th supporting foot outwards and gets away from an opening of the groove rotatably.

In an above-mentioned optional scheme, the portable tripod also includes a locating hole guide system. The locating hole guide system is arranged in the supporting legs and the first to (n-1)-th supporting feet embedded into the supporting legs in sequence. When the first to (n-1)-th supporting feet are stretched, the locating hole guide system respectively guides the locating shaft to enter into the limit hole under the effect of the locating spring.

In a further scheme, the locating hole guide system includes groove plates and bulge plates. The groove plates are respectively embedded and fixed into both sides of the tail end of the supporting leg and both sides of the tail ends of the first to (n-2)-th supporting feet, and a groove of the groove plate faces towards the connecting assembly. The bulge plates are respectively fixedly mounted on both sides of the bases of the locating devices in the first to (n-1)-th supporting feet, and a bulge of the bulge plate faces towards the foot cap. When the first to (n-1)-th supporting feet are stretched, the bulge plates of the first to (n-1)-th supporting feet are respectively matched with the groove plates of the first to (n-2)-th supporting feet and guide the corresponding locating shaft to enter into the corresponding limit hole under the effect of the corresponding locating spring. For example, when the first supporting foot is stretched, the bulge plate of the first supporting foot is matched with the groove plate of the supporting leg and guides the locating shaft of the first supporting foot to enter into the limit hole of the supporting leg under the effect of the locating spring. When the second supporting foot is stretched, the bulge plate of the second supporting foot is matched with the groove plate of the first supporting foot and guides the locating shaft of the second supporting foot to enter into the limit hole of the first supporting foot under the effect of the locating spring. The rest may be deduced by analogy.

In another further scheme, the locating hole guide system includes rail slots. The rail slots are respectively formed in both sides of the supporting leg and both inner sides of the first to (n-2)-th supporting feet. One end of each of the rail slots is respectively ended at the limit holes in both sides of the tail end of the supporting leg and the limit holes in both sides of the tail ends of the first to (n-2)-th supporting feet, and the other ends of the rail slots are respectively ended at both sides of the head end of the supporting leg and both sides of the head ends of the first to (n-2)-th supporting feet.

In an above-mentioned optional scheme, the portable tripod also includes a locating hole guide system. The locating hole guide system is arranged in the supporting legs and the first supporting foot embedded into the supporting legs in sequence. When the first supporting foot is stretched, the locating hole guide system guides the locating shaft to enter into the limit hole under the effect of the locating spring.

In a further scheme, the locating hole guide system includes groove plates and bulge plates. The groove plates are embedded and fixed into both sides of the tail end of the supporting leg, and a groove of the groove plate faces towards the connecting assembly. The bulge plates are respectively fixedly mounted on both sides of the base of the locating device in the first supporting foot, and a bulge of the bulge plate faces towards the foot cap. When the first supporting foot is stretched, the bulge plate of the first supporting foot is matched with the groove plate of the supporting leg and guides the corresponding locating shaft to enter into the corresponding limit hole under the effect of the locating spring.

In another further scheme, the locating hole guide system includes rail slots. The rail slots are formed in both sides of the supporting leg. One end of each of the rail slots is respectively ended at the limit holes in both sides of the tail end of the supporting leg, and the other ends of the rail slots are respectively ended at both sides of the head end of the supporting leg. When the first supporting foot is stretched, the locating shaft of the first supporting foot reaches and enters into the corresponding limit hole under the guide of the rail slot and the effect of the locating spring.

Beneficial Effects

Compared with the prior art, the portable tripod provided by the present disclosure has the following beneficial effects.

Firstly, the portable tripod is compact in structure, small in size after storage, and very portable.

Secondly, due to the compact structure of the portable tripod, the three supporting legs can be stored and used as handles, so in some embodiments, the middle shaft tube can be independently stretched and used as a selfie stick.

Thirdly, according to the portable tripod, in some embodiments in which a plurality of sleeves can sleeve the middle shaft tube, the middle shaft tube can be optionally quickly disassembled from the connecting assembly, and the middle shaft tube can be used as a selfie stick alone after disassembly.

BRIEF DESCRIPTION OF THE DRAWINGS

To describe the technical schemes in the embodiments of the present discourse more clearly, the following briefly describes the attached figures required for describing the embodiments. Apparently, the attached figures in the following descriptions show merely some embodiments of the present disclosure, and thus should not to be regarded as limitation of the scope; and a person of ordinary skill in the art may derive other attached figures from these attached figures without creative efforts.

FIG. 27 is an enlarged view of area B in FIG. 25.

FIG. 28A is a three-dimensional structural schematic diagram after the portable tripod is stored in the present disclosure.

FIG. 28B is a central transverse section view after the portable tripod is stored in the present disclosure.

FIG. 28C is a schematic diagram of a supporting foot with a transverse section in the shape of a "bracket" of the portable tripod in the present disclosure.

Reference signs in attached figures:

1, supporting leg;

11, connector; 12, upper arc-shaped wall; 13, lower arc-shaped wall; 14, side wall;

101, limit hole; 111, connecting hole; 141, upper side wall; 142, lower side wall;

2, connecting assembly;

21, connecting base; 22, locking knob; 23, locking ring;

211, base head; 212, base shaft hole; 213, base shaft; 214, locking threaded hole; 231, locking bulge; 232, locking half-opening; 233, locking full-opening;

3, supporting foot;

31, first supporting foot; 32, second supporting foot; 33, third supporting foot; 34, fourth supporting foot; 35, fifth supporting foot;

301, limit hole; 302, fixed ring; 303, limit ring; 350, groove; 351, foot cap;

3510, clamping bulge;

4, middle shaft tube;

41, middle shaft sleeve;

401, round top; 402, clamping shaft;

5, fixing device;

51, support rail; 52, support rod; 52, support connector;

511, strip opening; 512, outlet; 513, mounting port; 521, protruding ball; 531, support tray; 532, three claws; 533, support shaft;

5110, bulge; 5311, clamping bulge; 5321, opening; 5322, spherical cavity; 5331, screw structure; 5332, clamping shaft; 5333, round top;

6, locating device;

61, base; 62, locating spring; 63, locating shaft; 64, locating rail;

601, locating hole; 610, unlocking hole; 611, unlocking block; 612, circular hole; 631, fixture block;

71, bulge plate; 72, groove plate; 73, rail slot;

8, fastening device;

81, fastening shaft; 82, fastening spring; 83, fastening head;

811, clamp ring; 830, circular hole; 831, elastic clamping piece; and

9, tripod head.

DETAILED DESCRIPTION OF THE DRAWINGS AND THE PRESENTLY PREFERRED EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Generally, the described and illustrated components of the embodiments of the present disclosure in the attached figures can be arranged and designed through various different configurations. Therefore, the detailed description of the embodiments of the present disclosure provided in the attached figures is not intended to restrict the protected scope of the present disclosure, but merely represents the selected embodiment of the present disclosure. All other embodiments obtained by those skilled in the art based on the embodiments of the present disclosure without creative efforts shall fall within the protection scope of the present disclosure.

Embodiment I

Figure 1:
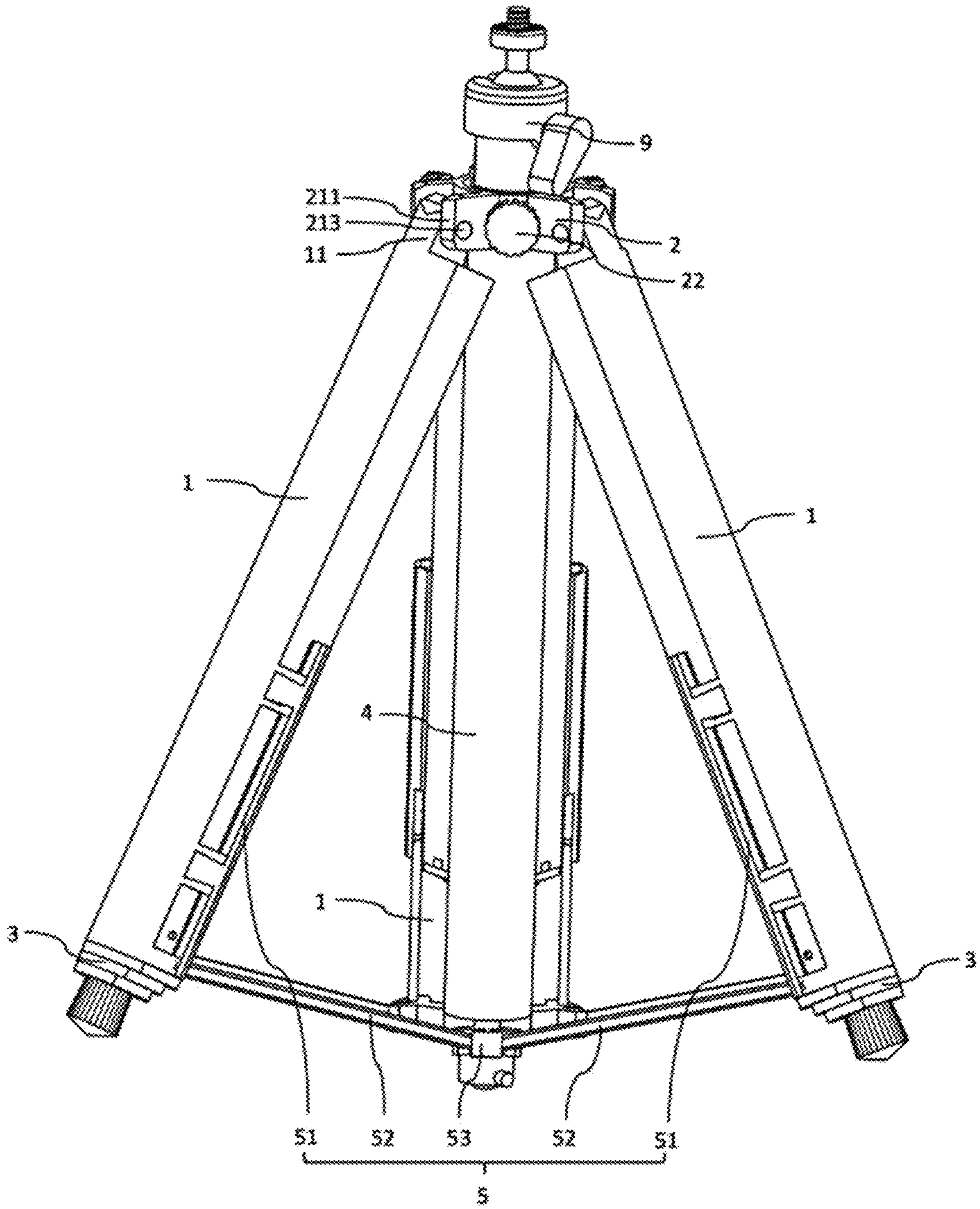
FIG. 1 is a stereoscopic structural schematic diagram of a portable tripod in the present disclosure.
Figure 13:
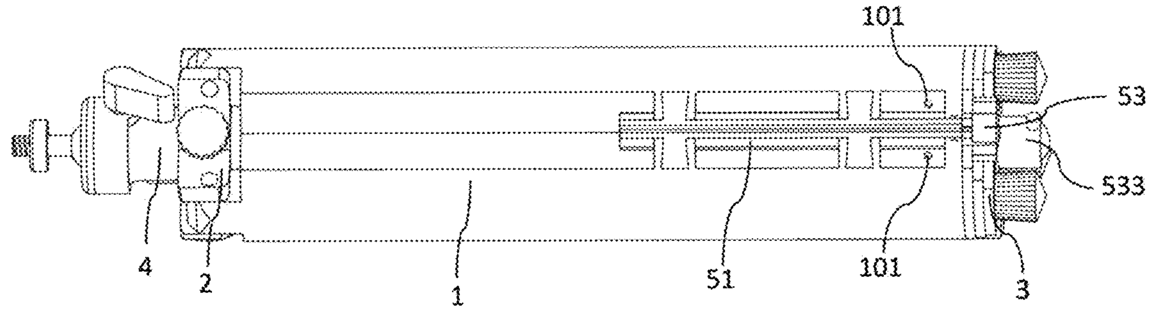
FIG. 13 is a schematic diagram of the portable tripod in the unfolding process (before unfolding) in the present disclosure.

As shown in FIG. 1, the embodiment of the present disclosure provides a portable tripod. The portable tripod includes a connecting assembly 2, three supporting legs 1 and a middle shaft tube 4. A head end of the supporting leg 1 is rotatably connected with the connecting assembly 2, and at least one supporting foot 3 is embedded into the supporting leg 1. As shown in FIG. 6 to FIG. 12, the three supporting legs 1 and the supporting feet 3 respectively in the supporting legs can be folded inwards to form a compact hollow cylinder. As shown in FIG. 13, the middle shaft tube 4 is embedded into the connecting assembly 2, and the three supporting legs 1 and the supporting feet 3 respectively in the supporting legs 1 can be folded inwards to allow the middle shaft tube to compactly combine with each other for the formation of the compact hollow cylinder 4. Those skilled in the art easily understand that the space shape of the hollow cylinder described herein is matched with the middle shaft tube 4. The space utilization ratio of the three supporting legs 1 and the middle shaft tube 4 is maximized after the tripod is stored, so that the tripod is very compact. Therefore, the portable tripod in the embodiment of the present disclosure is small in size after being stored and is very portable.

Figure 3:
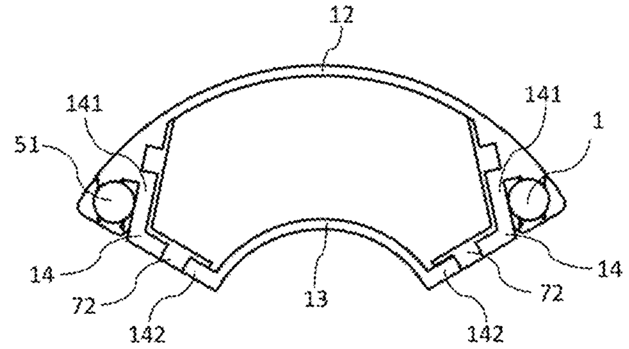
FIG. 3 is a downward-looking structural schematic diagram of any supporting leg in the present disclosure.
Figure 4:
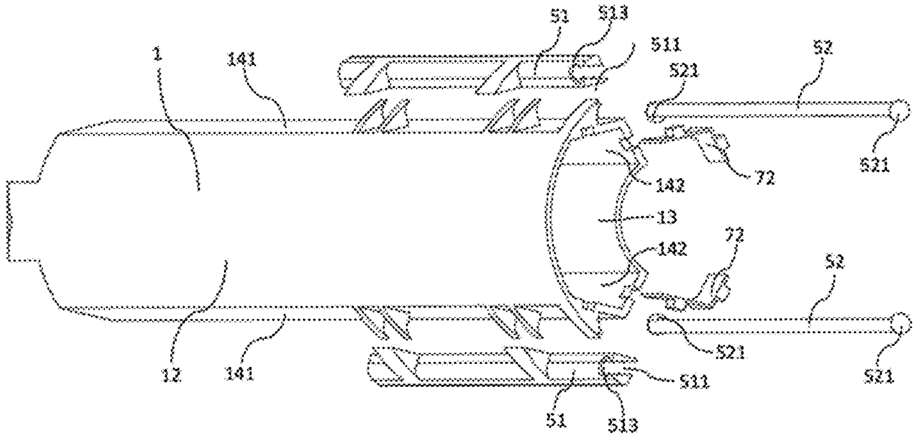
FIG. 4 is an explosive view of any supporting leg and a part of a support fixing device of the supporting leg in the present disclosure.
Figure 5:
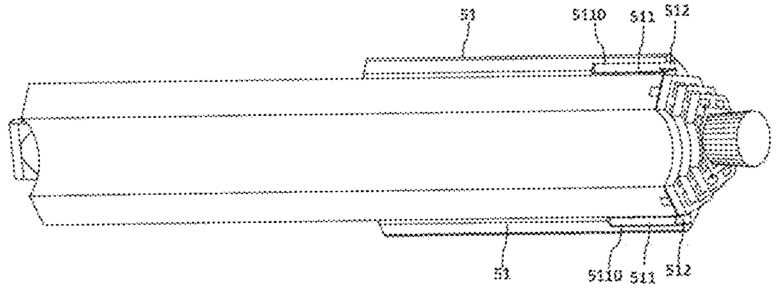
FIG. 5 is a three-dimensional structural schematic diagram after any supporting leg and the supporting foot respectively in the supporting leg are stored in the present disclosure.

As shown in FIG. 3, FIG. 4 and FIG. 5, in the embodiment, the middle shaft tube of the supporting leg 1 is in the shape of a ⅓ hollow ring. The supporting leg 1 includes a pair of side walls 14, an upper arc-shaped wall 12 and a lower arc-shaped wall 13, and the pair of side walls 14, the upper arc-shaped wall 12 and the lower arc-shaped wall 13 are encircled to form an annular tube body. Those skilled in the art easily understand that the middle shaft tube of the supporting leg of the general tripod is in the shape of a circular ring, that is, in the shape of an "0", and it is difficult for three supporting legs in the shape of "0" and the middle shaft tube to form a compact space. However, in the embodiment, the middle shaft tube of the supporting leg 1 is in the shape of a ⅓ hollow ring, and three such supporting legs 1 and the middle shaft tube can form a compact space.

In order to enhance the structural strength of the supporting legs 1 and the supporting feet 3 embedded into the supporting legs 1, as shown in FIG. 3 and FIG. 4, the side walls 14 of the supporting leg 1 include an upper side wall 141 and a lower side wall 142, and each pair of side walls 14 are encircled in pairs in opposite directions to form the shape of a "bracket". It is understandable that in the embodiment, the shape of a "bracket" can be a similar shape of "( )", a similar shape of "< >" or other variants. Upper and lower openings in the shape of a "bracket" are smaller than the maximum diameter inside the shape of a "bracket", so the supporting leg 1 and the supporting foot 3 embedded into the supporting leg cannot be separated from the side walls 14 when being stretched.

Figure 6:
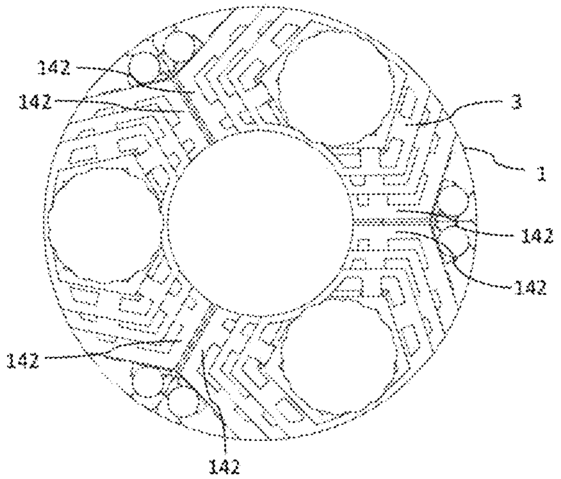
FIG. 6 is a downward-looking structural schematic diagram after the portable tripod is stored in the present disclosure.

In the embodiment, as shown in FIG. 6, every two adjacent lower side walls 142 are matched with each other in pairs after the three supporting legs 1 are folded inwards. At this time, the space utilization rate is the highest. Of course, optionally, in another embodiment, according to different requirements and in order to reduce weight, every two adjacent lower side walls 142 are arranged at a certain interval after the three supporting legs 1 are folded inwards. For example, the middle shaft tube of the supporting leg 1 is in the shape of a ¼ hollow ring, and three such supporting legs 1 in the shape of a ¼ hollow ring are encircled to form a hollow cylinder at a certain interval.

Figure 2:
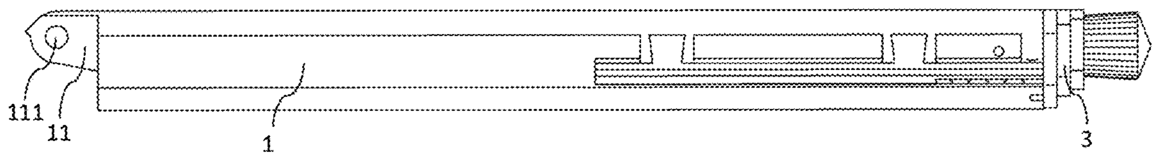
FIG. 2 is a side-looking structural schematic diagram after any supporting leg and the supporting foot respectively in the supporting leg are stored in the present disclosure.
Figure 7:
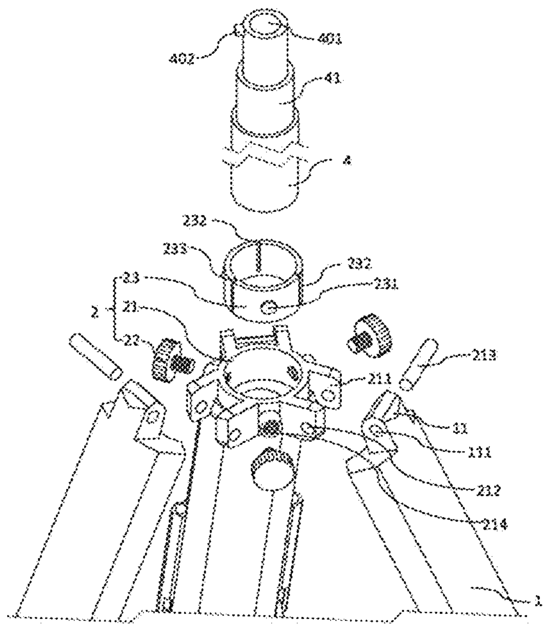
FIG. 7 is an explosive view of the connecting assembly in the present disclosure.
Figure 8:
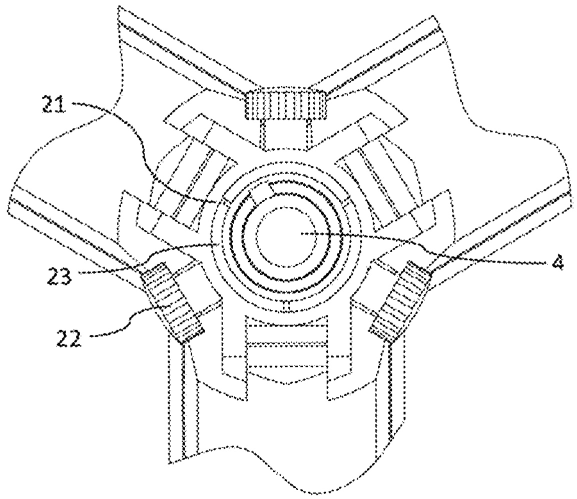
FIG. 8 is an upward-looking structural schematic diagram of the connecting assembly in the present disclosure.
Figure 9A:
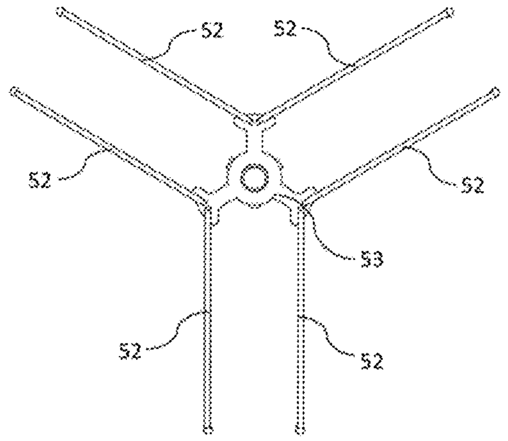
FIG. 9A is an upward-looking structural schematic diagram when the three pairs of support rods and the support connectors are unfolded in the present disclosure.
Figure 9B:
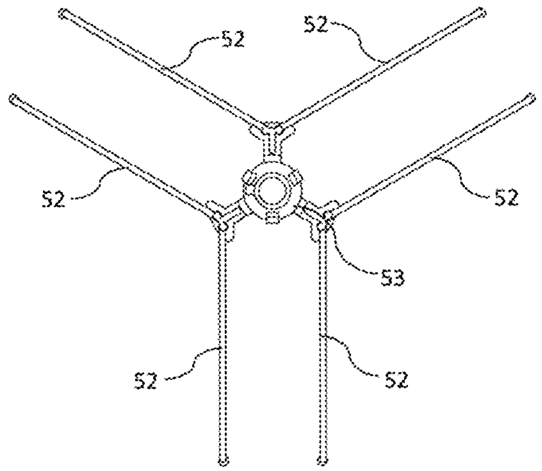
FIG. 9B is a downward-looking structural schematic diagram when the three pairs of support rods and the support connectors are unfolded in the present disclosure.
Figure 9C:
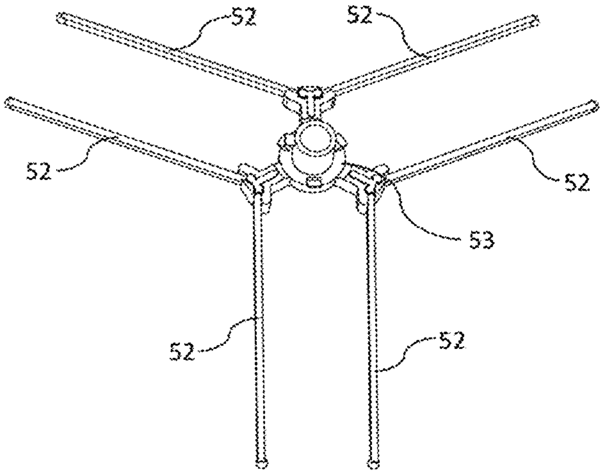
FIG. 9C is a three-dimensional structural schematic diagram when the three pairs of support rods and the support connectors are unfolded in the present disclosure.

In the embodiment, as shown in FIG. 7 and FIG. 8, the connecting assembly 2 includes a connecting base 21, a locking knob 22 and a locking ring 23. The connecting base 2 is internally in the shape of a circular ring. Three outward protruding base heads 211 and at least one locking threaded hole 214 are arranged outside the connecting base 21. The locking threaded hole 214 is in threaded connection with the locking knob 22. The locking ring 23 is coaxial to the connecting base 21. As shown in FIG. 2 and FIG. 7, the head end of the supporting leg 1 includes a connector 11, and the connector 11 is rotatably connected with the base head 211. It is understandable that in the machinery field, the connector 11 and the base head 211 are rotatably connected in many manners. For example, as shown in FIG. 1 and FIG. 7, a coaxial base shaft hole 212 is respectively formed in both sides of the base head 211. The base shaft hole 212 is internally provided with a base shaft 213. A connecting hole 111 is formed in the interior of the connector 11. The connecting hole 111 in the interior of the connector 11 is coaxial to the base shaft hole 212. The base shaft 213 passes through the connecting hole 111 in the interior of the connector 11 and the base shaft hole 212 so that head ends of the three supporting legs 1 are rotatably connected with the connecting base 21. Examples are not given in detail herein. The middle shaft tube 4 is embedded into the connecting assembly 2. The middle shaft tube 4 can be immovably fixed in the connecting assembly 2, and also can move in the connecting assembly 2 fixed at different positions. As shown in FIG. 1 and FIG. 7, the locking ring 23 includes a locking bulge 231, a locking half-opening 232 and a locking full-opening 233. The locking bulge 231 is coaxial to the locking threaded hole 214. When the middle shaft tube 4 needs to move up and down, the locking knob 22 is loosened, and then the middle 4 is moved up and down to a required position. The locking knob 22 is screwed down. At this time, the locking knob 22 can extrude the locking bulge 231 inward. The locking ring 23 is tightened, and the middle shaft tube is fixed immovably. There are still many ways to realize the fixation of the connecting assembly 2 and the middle shaft tube, and examples are not given in detail herein.

In an optimized embodiment, as shown in FIG. 1, in order to stabilize the tripod, the portable tripod also includes a support fixing device 5. As shown in FIG. 4, FIG. 9A, FIG. 9B and FIG. 9C, the support fixing device 5 includes three pairs of support rails 51, three pairs of support rods 52 and support connectors 53. The three pairs of support rails 51 are mounted at lower ends of the two upper side walls 141 of the three supporting legs 1 respectively. The three pairs of support rods 52 are slidably mounted on the three pairs of support rails 51 respectively, and at least one end of the support rod 52 is not separated from the support rail. The other ends of the three pairs of support rods 52 are rotatably mounted on the support connectors 53 respectively. Those skilled in the art easily realize that there are many ways to mount the three pairs of support rails 51 at the lower ends of the two upper side walls of the three supporting legs 1, such as direct bonding with strong glue, or inserting by a physical structure with a bolt method. In addition, the three pairs of support rails 51 can also be directly integrally formed with the lower ends of the two upper side walls of the three supporting legs 1, so examples are not given in detail herein.

As shown in FIG. 3, FIG. 4 and FIG. 5, a cylindrical cavity is formed inside of the support rail 51. For the purpose that the tripod can be fixed at different opening angles, a strip opening 511 with a width of smaller than the diameter of the cylindrical cavity is formed in the outer side of the support rail 51. At least one pair of bulges 5110 are arranged on both sides of the strip opening 511 at the lower end of the support rail 51. The strip opening 511 is suitably matched with the support rod 52. That is, when the tripod is unfolded, one end of the support rod 52 can be fixed at different positions of the support rail 51, and then different angles are realized. The bulges 5110 can prevent one end of the support rod 52 from sliding up and down after being fixed. As shown in FIG. 3, in order to prevent the support rod 52 from being separated from the support rail, an outlet 512 with a minimum diameter of smaller than the diameter of the cylindrical cavity is formed in the lower end of the support rail 51. As shown in FIG. 4, for ease of mounting, a mounting port 513 with a minimum diameter of larger than or equal to the diameter of the cylindrical cavity is formed in the inner side of the lower end of the support rail 51. The support rod 52 can be mounted into the support rail 51 through the mounting port 513 in advance, and then the support rail 51 is mounted at the lower ends of the two upper side walls 141 of the supporting leg 1. At the same time, the mounting port 513 is closed.

Figure 10:
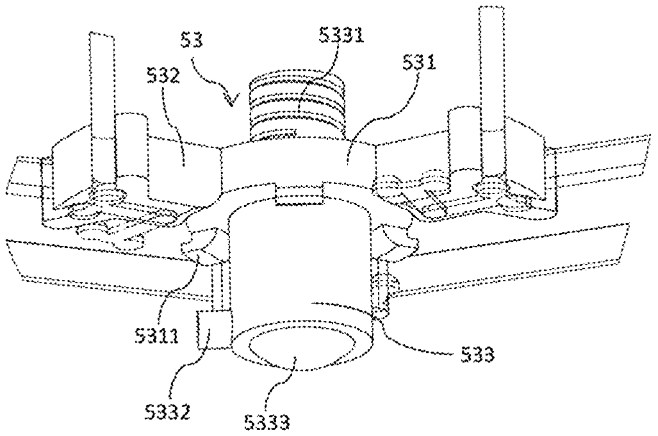
FIG. 10 is a three-dimensional structural schematic diagram of the support connector (including a support shaft) in the present disclosure.
Figure 11:
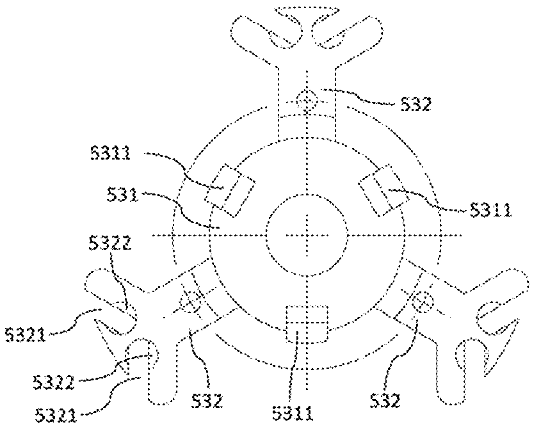
FIG. 11 is a downward-looking structural schematic diagram of the support connector in the present disclosure.
Figure 12:
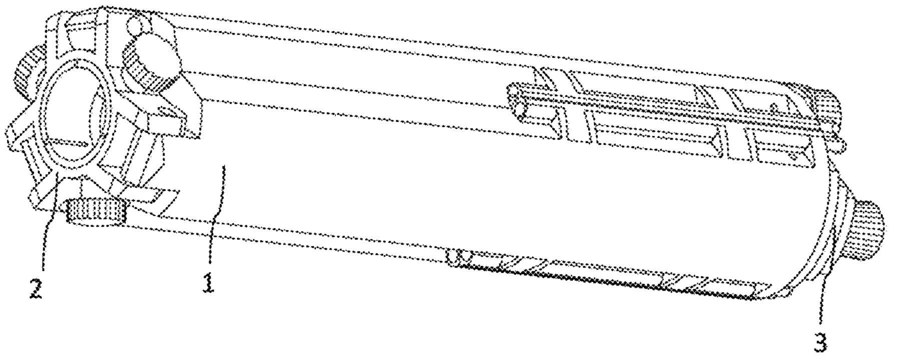
FIG. 12 is a three-dimensional structural schematic diagram after the portable tripod (a middle shaft tube is unshown) in the present disclosure.

As shown in FIG. 10 and FIG. 11, the support connector 53 includes a support tray 531 and three claws 532. The three claws 532 are arranged outside the support tray 531, and the included angle between every two claws 532 is 120 degrees. Two openings 5321 with an included angle of 120 degrees are formed in a tail end of the claw 532. A spherical cavity 5322 is formed in the interior of the opening 5321. As shown in FIG. 4, protruding balls 521 are arranged at both ends of the support rod 52. The spherical cavity 5322 is suitably rotatably connected with the protruding ball 521 at the other end of the support rod 52. It is understandable that in order to prevent the protruding ball 521 at the other end of the support rod 52 from falling off, the ball diameter of the protruding ball 521 is larger than the width of the opening 5321, and the protruding ball 521 at the other end of the support rod 52 can rotate up and down at the spherical cavity 5322 along the opening 5321.

Figure 32:
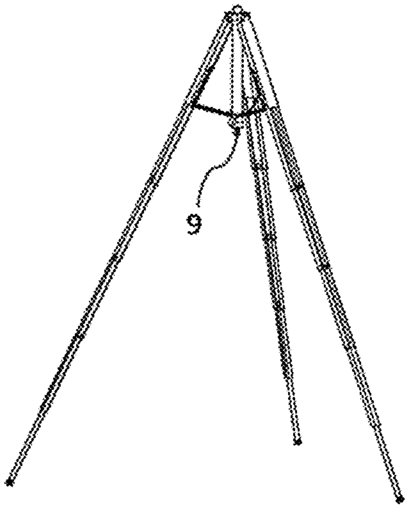
FIG. 32 is a structural schematic diagram of an inverted tripod head after the supporting legs of the portable tripod and the supporting feet respectively in the supporting legs are completely unfolded in the present disclosure.
Figure 33:
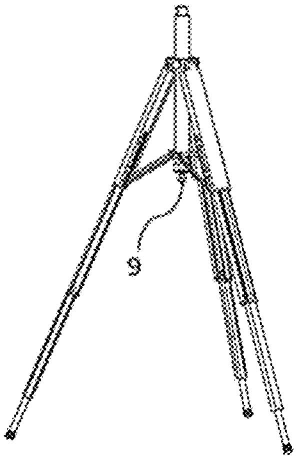
FIG. 33 is a structural schematic diagram of an inverted tripod head after the supporting legs of the portable tripod and the supporting feet respectively in the supporting legs are partially unfolded in the present disclosure.
Figure 34:
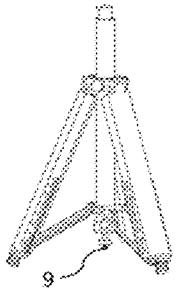
FIG. 34 is a structural schematic diagram of an inverted tripod head after the supporting legs of the portable tripod and the supporting feet respectively in the supporting legs are completely folded in the present disclosure.

As shown in FIG. 10, the support connector 53 also includes a support shaft 533. A hollow hole is formed coaxially withformed coaxially with the support tray 531. An upper end of the support shaft 533 is of a screw structure 5331. The upper end of the support shaft 533 is in threaded connection with a lower end of the middle shaft tube 4 to play a fixing role. Around the midponit of the support shaft 4 is rotatably connected with the hollow hole formed coaxially with the support tray 531. An annular clamping slot (unshown in figures) is formed in around the midponit of the support shaft 533. The annular clamping slot restricts the support shaft 533 from moving up and down. That is, the support shaft 533 can perform rotational movement only. A lower end of the support shaft 533 is provided with a clamping shaft 5332 and a round top 5333. As shown in FIG. 32, FIG. 33 and FIG. 34, the lower end of the support shaft 533 can be connected with a mounting hole beneath a tripod head 9 through the clamping shaft 5332 and the round top 5333. Therefore, the lower end of the support shaft 533 is provided with the clamping shaft 5332 and the round top 5333, so that the usage scenarios of the tripod are expanded. For example, a camera can be used for inverted shooting at a low angle.

As shown in FIG. 10, FIG. 11 and FIG. 28A, the support tray 531 also includes a clamping bulge 5311. In the embodiment, the support of the portable tripod is in a stored state, and the clamping bulge 5311 is matched with the supporting leg 3 to prevent the supporting leg 3 from sliding out.

Preferably, the support rail 51 is of certain elasticity, so that one end of the support rod 52 can smoothly pass through the bulges on both sides of the strip opening 511 in the lower end of the support rail 51 when sliding up and down. One end of the support rod 52 can be fixed without artificial external force by the bulges.

An unfolding process of the support fixing device 5 of the portable tripod in the embodiment is briefly described below.

First, as shown in FIG. 13 and FIG. 28A, the tripod is in a stored state, the support rod 52 (unshown in figures) is arranged in the support rail 51, and the support shaft 533 is in threaded connection with the lower end of the middle shaft tube 4.

Figure 14:
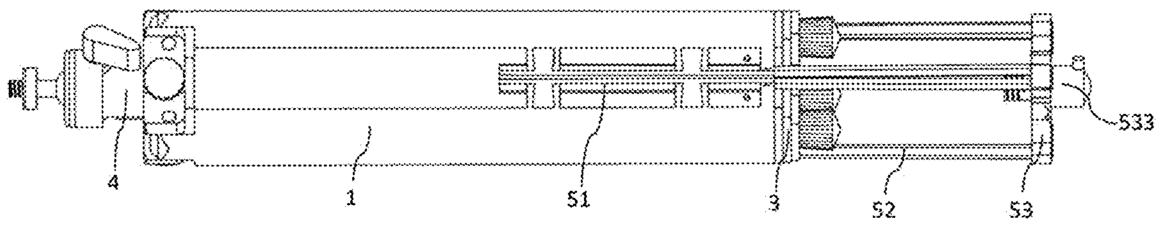
FIG. 14 is a schematic diagram of the portable tripod in the unfolding process (during unfolding) in the present disclosure.

Then, as shown in FIG. 14, the threaded connection between the support shaft 533 and the lower end of the middle shaft tube 4 is unscrewed, and the support rod 52 is pulled outward to a certain position.

Finally, as shown in FIG. 1, the supporting leg 1 is opened. At the same time, the other end of the support rod 52 is in threaded connection with the lower end of the middle shaft tube 4 again through the support shaft 533 fixedly. At this time, different opening angles of the supporting leg 1 can be realized by adjusting the position of one end of the support rod 52 at the strip opening 511 in the lower end of the support rail 51.

In an optional scheme, the middle shaft tube 4 is a single tube. For ease of quick loading and unloading of the tripod head 9, an upper end of the middle shaft tube 4 is provided with a clamping shaft 402 and a round top 401. The middle shaft tube 4 can be connected with the mounting hole in the bottom of the tripod head 9 through the clamping shaft 402 and the round top 401. A threaded hole is formed in a lower end of the middle shaft tube 4. That is, the threaded hole can be in threaded connection with the upper end of the support shaft 533.

Figure 29:
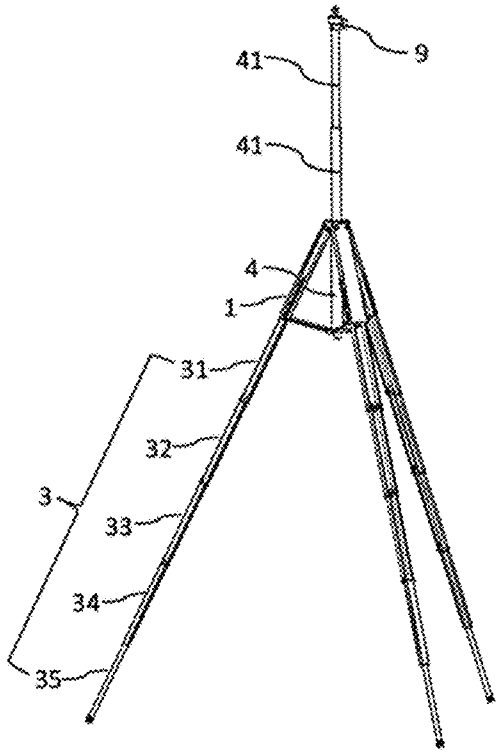
FIG. 29 is a structural schematic diagram after the supporting legs of the portable tripod and the supporting feet respectively in the supporting legs are completely unfolded and the middle shaft tube is completely unfolded in the present disclosure.
Figure 30:
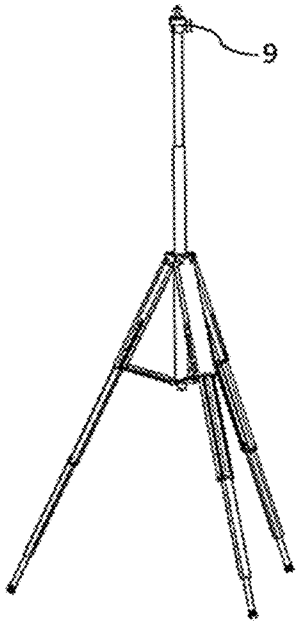
FIG. 30 is a structural schematic diagram after the supporting legs of the portable tripod and the supporting feet respectively in the supporting legs are partially unfolded and the middle shaft tube is completely unfolded in the present disclosure.
Figure 31:
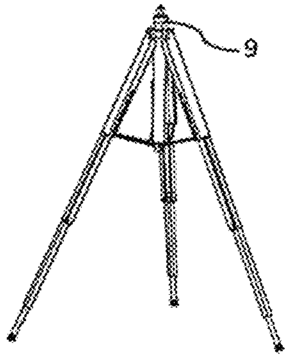
FIG. 31 is a structural schematic diagram after the supporting legs of the portable tripod and the supporting feet respectively in the supporting legs are partially unfolded and the middle shaft tube is shrunk in the present disclosure.

Of course, as shown in FIG. 29, in order to lengthen the length of the middle shaft tube 4, in another optional scheme, at least one middle shaft sleeve 41 sleeves the middle shaft tube 4 internally. The middle shaft tube 4 and the middle shaft sleeve 41 are adjacent in pairs and telescopically connected. A threaded hole is formed in a lower end of the innermost middle shaft sleeve 41. An upper end innermost of the middle shaft sleeve 41 is provided with a clamping shaft 402 and a round top 401. The innermost middle shaft sleeve 41 is connected with a mounting hole beneath a tripod head 9 through the clamping shaft 402 and the round top 401. It should be noted that the tripod head 9 described herein may be a photographic tripod head 9 disclosed in Chinese Invention Patent ZL201620760201.6. Therefore, on one hand, the overall height of the entire tripod can be lengthened by a plurality of middle shaft sleeves 41 embedded into the middle shaft tube 4. On the other hand, the middle shaft tube 4 can be used as a selfie stick alone when the middle shaft tube 4 is disassembled, or the middle shaft tube 4 is not disassembled, and the three supporting legs 1 are used as handles and the middle shaft tube 4 is used as a selfie stick when the tripod is stored.

In the embodiment, n supporting feet 3 are embedded into the supporting leg 1 in sequence, and n is a positive integer of greater than or equal to 3. That is, at least three supporting feet 3 are embedded into the supporting leg 1 in sequence. Here, for ease of the description of the relationship between the supporting leg 1 and the internal supporting feet 3, "n" is used to express the number of the supporting feet 3.

Figure 15:
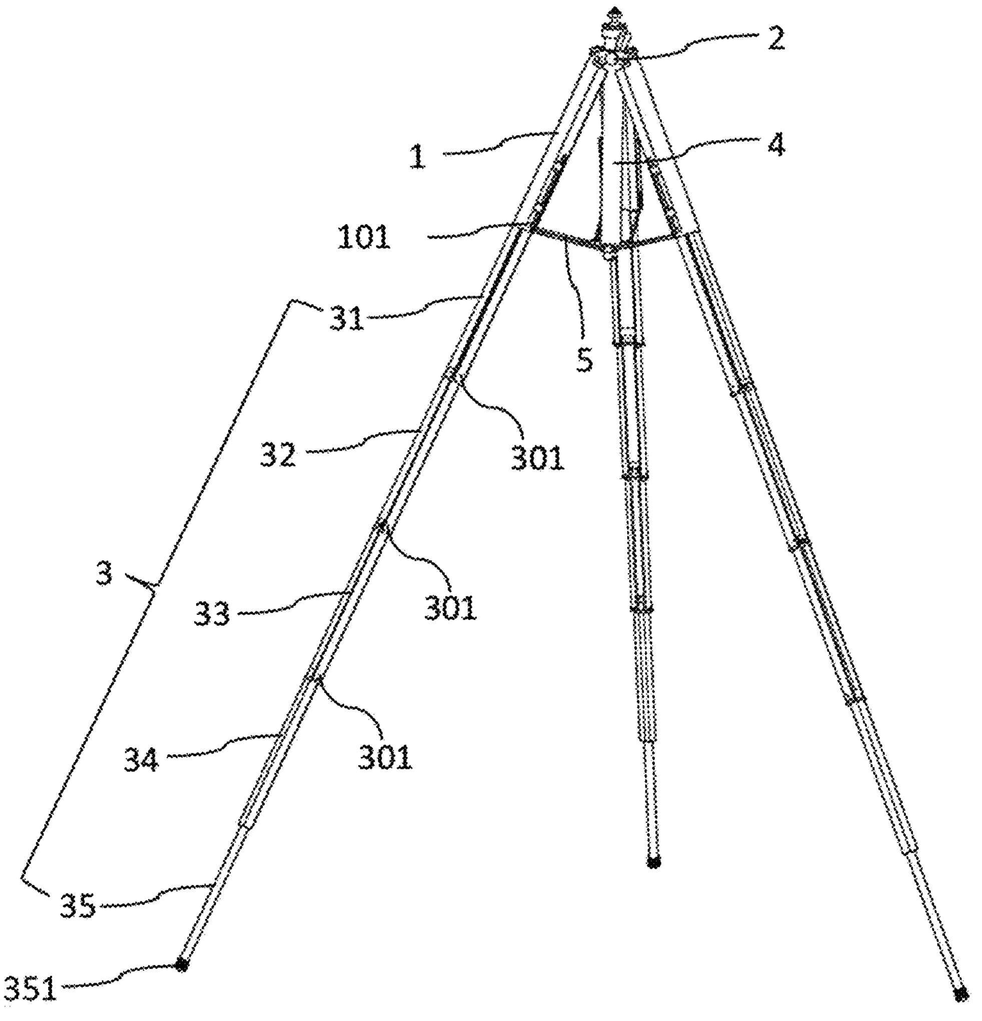
FIG. 15 is a schematic diagram of the portable tripod in the unfolding process (after unfolding) in the present disclosure.
Figure 16:
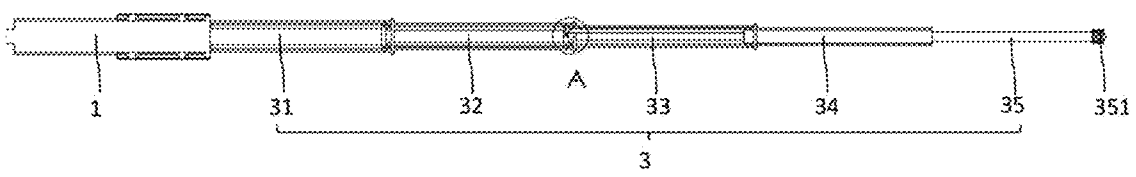
FIG. 16 is a side-looking structural schematic diagram after any supporting leg and the supporting foot respectively in the supporting leg are unfolded in the present disclosure.
Figure 17A:
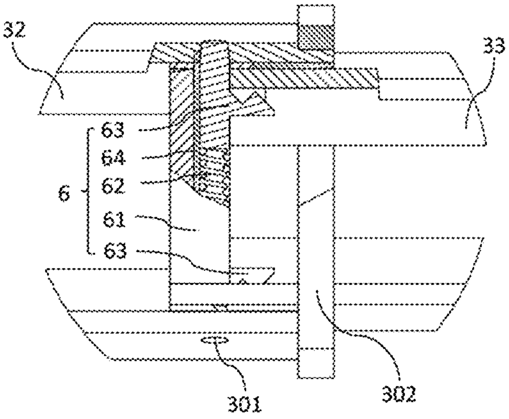
FIG. 17A is an enlarged view of area A in FIG. 16.
Figure 17B:
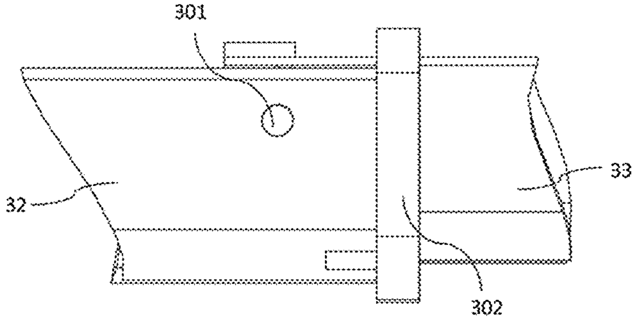
FIG. 17B is a side-looking structural schematic diagram of FIG. 17A.
Figure 17C:
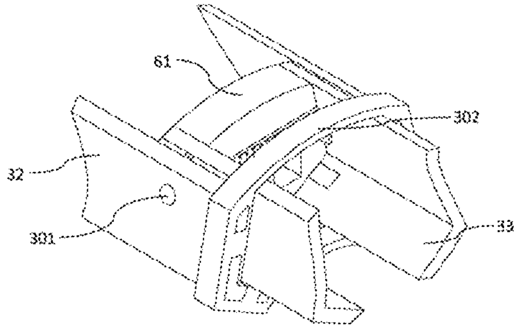
FIG. 17C is a three-dimensional schematic diagram of FIG. 17A.
Figure 17D:
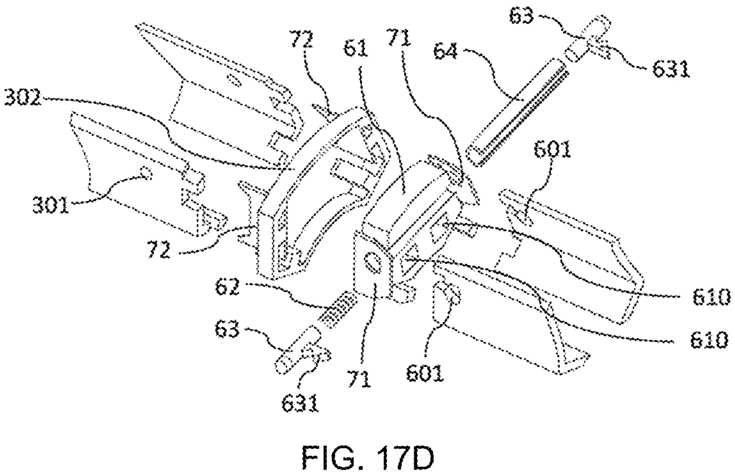
FIG. 17D is an explosive view of FIG. 17A.
Figure 18:
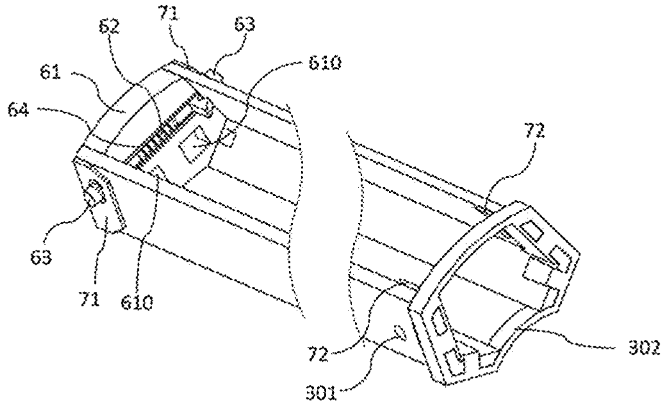
FIG. 18 is a three-dimensional structural schematic diagram of the first to (n-2)-th supporting feet in the present disclosure, and the n is a positive integer of greater than or equal to 3.

In one of specific embodiments, n is equal to 5. As shown in FIG. 15 and FIG. 16, the first to n-th supporting feet include a first supporting foot 31, a second supporting foot 32, a third supporting foot 33, a fourth supporting foot 34 and a fifth supporting foot 35 respectively. The following describes the specific structures and telescoping principles of the supporting leg 1 and the first to n-th supporting feet in the specific embodiment.

First, the specific structures and stretching process of the supporting leg 1 and the first to (n-1)-th supporting feet in the specific embodiment are described as follows.

As shown in FIG. 13, a limit hole 101 is formed in a tail end of the supporting leg 1. As shown in FIG. 17A, FIG. 178, FIG. 17C and FIG. 17D, head ends of the first to (n-1)-th supporting feet are provided with a locating hole 601 and a locating device 6 respectively. The locating device includes a base 61, a locating spring 62, locating shafts 63 and a locating rail 64. The locating rail 64 is mounted in the base 61 and coaxial to the locating hole 601. The locating spring 62 is arranged at the middle part inside the locating rail 64. The locating shafts 63 are arranged on both sides of the locating spring 62 respectively. The locating shaft 63 can move on the locating rail 64 and is coaxial to the locating hole 601. The middle part of the locating shaft 63 is provided with a protruding fixture block 631. Of course, those skilled in the art easily understand that the locating rail 63 can also be integrally formed with the base 61, and even the base 61 and the head end of the supporting leg can be integrally formed. In addition, the base 61 simultaneously plays a role in fixedly connecting the head ends of the first to (n-1)-th supporting feet. As shown in FIG. 17A, FIG. 178, FIG. 17C, FIG. 17D and FIG. 18, tail ends of the first to (n-2)-th supporting feet are provided with a limit hole 301 and a fixed ring 302 respectively. The fixed rings 302 are fixedly mounted at the tail ends of the first to (n-2)-th supporting feet. The fixed ring 302 plays a role in fixedly connecting the tail ends of the first to (n-2)-th supporting feet. When the first supporting foot is stretched, the locating shaft 63 of the first supporting foot enters into the limit hole 101 in the tail end of the supporting leg 1 under the effect of the locating spring 62. At this time, the locating shaft 63 of the first supporting foot gets stuck by the limit hole 101 in the tail end of the supporting leg 1. The first supporting foot is fixed and cannot be stretched again. When the second to (n-1)-th supporting feet are stretched out, the corresponding locating shaft 63 enters into the corresponding locating hole 301 under the effect of the corresponding locating spring 62. For example, the locating shaft 63 of the second supporting foot enters into the locating hole 301 of the first supporting foot under the effect of the locating spring 62 of the second supporting leg. At this time, the locating shaft 63 of the second supporting leg gets stuck by the limit hole 301 of the first supporting leg. The second supporting foot is fixed and cannot be stretched again. At the same time, the fixed ring 302 at the tail end of the first supporting foot plays a role in stabilizing the first and second supporting feet. The stretching processes of the third to (n-1)-th supporting feet and the effects of the corresponding fixed rings are analogized in sequence, and are not described in detail any more.

Figure 19:
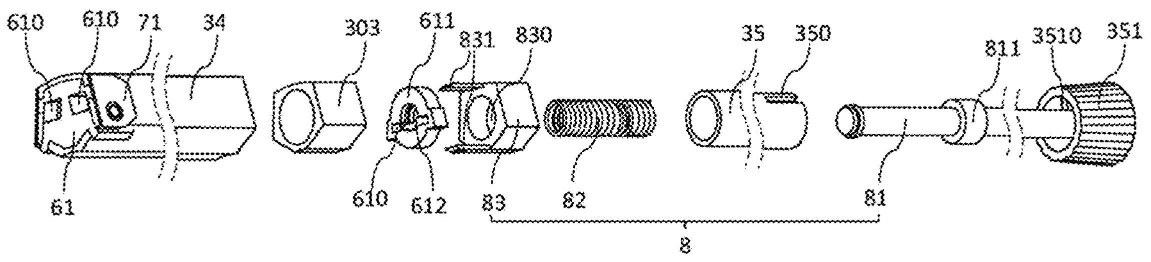
FIG. 19 is an explosive view of the n-th to (n-1)-th supporting feet in the present disclosure.
Figure 20A:
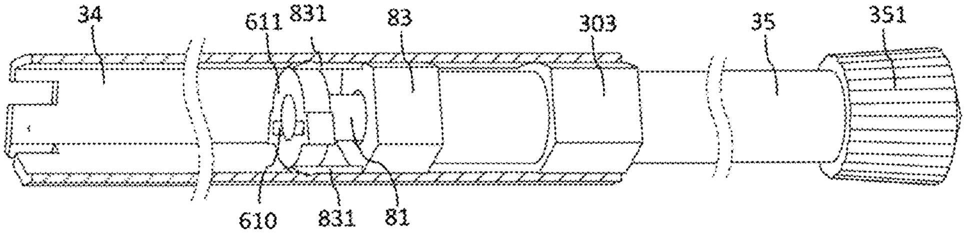
FIG. 20A is a structural schematic diagram when the n-th to (n-1)-th supporting feet are locked in the present disclosure.
Figure 20B:
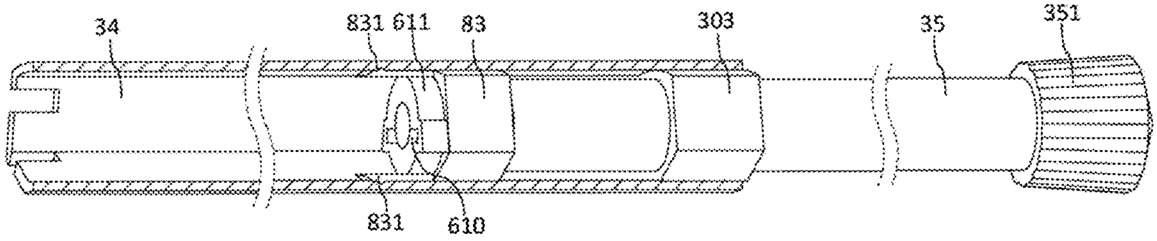
FIG. 20B is a structural schematic diagram when the n-th to (n-1)-th supporting feet are unlocked in the present disclosure.

As shown in FIG. 19, FIG. 20A and FIG. 208, a tail end of the (n-1)-th supporting foot is provided with a limit ring 303. The limit ring 303 can prevent the head end of the n-th supporting foot from being separated from the tail end of the (n-1)-th supporting foot.

In order to solve the problem that the first to (n-1)-th supporting feet are fixed and cannot be stretched during being stretched out, the following structures of the second to n-th supporting feet in the specific embodiment are designed as follows.

as shown in FIG. 19, FIG. 20A, FIG. 208, FIG. 21 and FIG. 22, an unlocking hole 610 is formed in the base 61 at head ends of the second to (n-1)-th supporting feet, and the unlocking holes 610 in the bases at the head ends of the second to (n-1)-th supporting feet are matched with the protruding fixture blocks 631 at the middle parts of the locating shafts 63 at the head ends of the first to (n-2)-th supporting feet respectively. A head end of the n-th supporting foot is provided with an unlocking block 611. An unlocking hole 610 is formed in the unlocking block 611. The unlocking hole 610 in the unlocking block 611 is suitably matched with the protruding fixture block 631 at the middle part of the locating shaft 63 at the head end of the (n-1)-th supporting foot.

As shown in FIG. 19, FIG. 20A, FIG. 208, FIG. 21 and FIG. 22, the n-th supporting foot is provided with a fastening device 8, and the fastening device 8 is suitably matched with an inner wall of the (n-1)-th supporting foot. That is, the n-th supporting foot can be tightly fixed together with the inner wall at any position of the (n-1)-th supporting foot through the fastening device 8.

Figure 25:
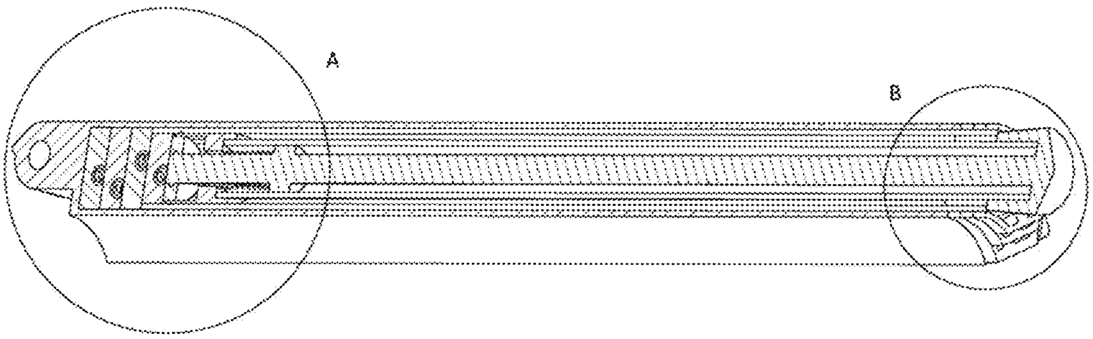
FIG. 25 is a section view after any supporting leg and the supporting foot respectively in the supporting leg are stored in the present disclosure.
Figure 26:
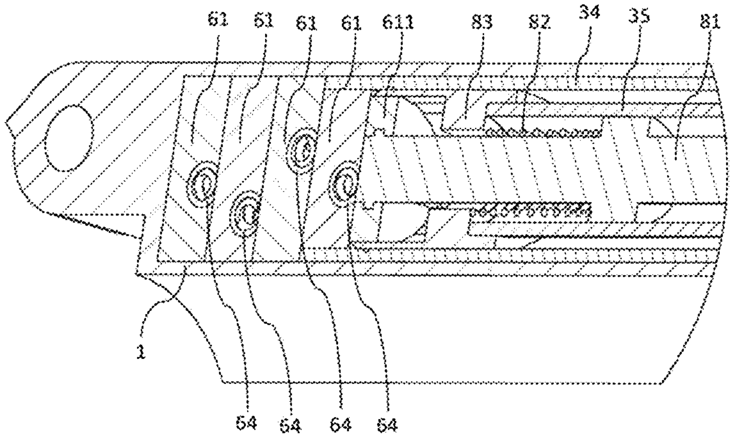
FIG. 26 is an enlarged view of area A in FIG. 25.

A tail end of the n-th supporting foot is provided with a foot cap 351. As shown in FIG. 25, FIG. 26, and FIG. 27, in order to save space, the unlocking holes 610 in the base 61 and the locating rails 64 are staggered up and down, and the locating rails 64 on the base 61 are not on the same axis along the direction of the supporting foot.

Further, as shown in FIG. 19, FIG. 20A, FIG. 208, FIG. 21 and FIG. 22, the fastening device 8 includes a fastening shaft 81, a fastening spring 82 and a fastening head 83, the middle part of the fastening shaft 81 is provided with a protruding clamp ring 811. One end of the fastening head 83 is convexly provided with two elastic clamping pieces 831. A circular hole 830 is formed coaxially with the fastening head 83. A circular hole 612 is formed coaxially with the unlocking hole 611.

Figure 21:
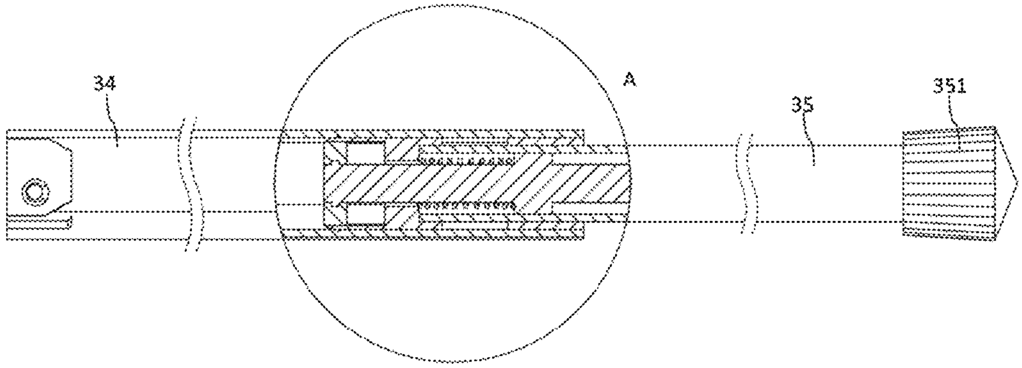
FIG. 21 is a part sectioned view when the n-th to (n-1)-th supporting feet are locked in the present disclosure.
Figure 22:
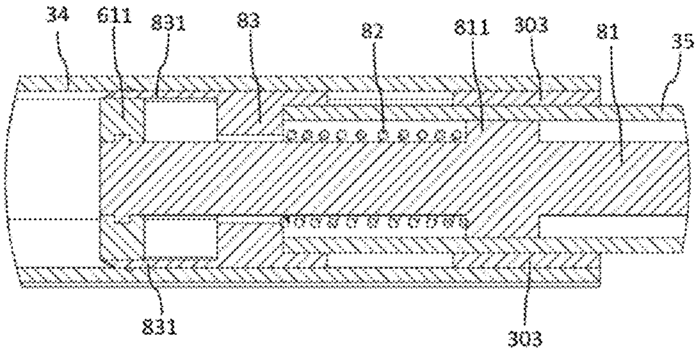
FIG. 22 is an enlarged view of area A in FIG. 21.

As shown in FIG. 19, the n-th supporting foot is embedded into the fastening shaft 81, and the fastening shaft 81 can move and rotate inside the n-th supporting foot. The foot cap 351 is fixedly connected with one end of the fastening shaft 81. As shown in FIG. 20A and FIG. 208, the other end of the fastening head 83 is fixedly connected with a head end of the n-th supporting foot. The other end of the fastening shaft 81 is rotatably connected with the circular hole 612 in the center of the unlocking block 611. As shown in FIG. 21 and FIG. 22, the fastening spring 82 is embedded into the fastening shaft 81. One end of the fastening spring 82 is fixed to the protruding clamp ring 811, and the other end of the fastening spring 82 is fixed to the other end of the fastening head 83. The fastening spring 82 is always in a stretched state. The outer side of the unlocking block 611 is slidably matched with the two elastic clamping pieces 831. As shown in FIG. 20A, when the outer side of the unlocking block 611 slides to tail ends of the two elastic clamping pieces 831, the elastic clamping pieces 831 are fastened and extruded with the inner wall of the (n-1)-th supporting foot. That is, the n-th supporting foot is fixed without moving at this time. As shown in FIG. 208, when the outer side of the unlocking block 611 slides to head ends of the two elastic clamping pieces 831, the elastic clamping pieces 831 can slide with the inner wall of the (n-1)-th supporting foot easily. Thus, the movement of the n-th supporting foot at any position on the inner wall of the (n-1)-th supporting foot is realized. That is to say, the n-th supporting foot and the (n-1)-th supporting foot can be adjusted at different supporting heights, so that the applicability of the tripod is improved.

Of course, there are still many ways to realize the movement of the n-th supporting foot at any position on the inner wall of the (n-1)-th supporting foot. For example, the fastening device 8 of the n-th supporting foot can be directly realized by designing the n-th supporting foot as a slightly elliptical tube body and arranging a slightly elliptical limit ring 303 at the tail end of the (n-1)-th supporting foot. The slightly elliptical tube body of the n-th supporting foot and the slightly elliptical limit ring 303 of the (n-1)-th supporting foot can rotate left and right to complete locking fastening fit or unlocking sliding fit. In order to complete unlocking for the (n-1)-th supporting foot, a circular hole 612 is formed coaxially with the unlocking block 612, and the head end of the n-th supporting foot is rotatably connected with the circular hole 612 in the center of the unlocking block.

Further, as shown in FIG. 19, the foot cap 351 is internally provided with a clamping bulge 3510. A groove 350 is formed in the tail end of the n-th supporting foot. The fastening spring 82 is always in a stretched state. When the outer side of the unlocking block 611 slides to the tail ends of the two elastic clamping pieces 831, the clamping bulge 3510 is in tight fit with the groove 350 in the tail end of the n-th supporting foot. At this time, under the tensile force that the fastening spring 82 is stretched, the unlocking block 611 always stays at the tail ends of the two elastic clamping pieces 831 to realize that the n-th supporting foot is fixed without moving for a long time. When the n-th supporting foot needs to move, the outer side of the unlocking block 611 slides to the head ends of the two elastic clamping pieces 831, and the clamping bulge 3510 inside the foot cap 351 is disengaged from the groove 350 in the tail end of the n-th supporting foot outwards and gets away from an opening of the groove rotatably at the same time. At this time, the clamping bulge 3510 inside the foot cap 351 is jacked a tail end port of the n-th supporting foot. At this time, the n-th supporting foot can easily move to any required position. When the n-th supporting foot moves to another position, the foot cap 351 is rotated again so that the clamping bulge 3510 inside the foot cap aligns to the opening of the groove 350 at the tail end of the n-th supporting foot. And then, the hand is loosened, and the clamping bulge 3510 inside the foot cap is in tight fit with the groove 350 in the tail end of the n-th supporting foot under the effect of the fastening spring 82, so that long-time fixation at another position is realized.

As shown in FIG. 29 to FIG. 34, the supporting foot of the portable tripod in the present disclosure can be unfolded at various different heights. The n-th supporting foot and the (n-1)-th supporting foot can be adjusted at different supporting heights, so that the applicability of the tripod is improved, and required heights can be adjusted on different ground surfaces. In addition, upper and lower ends of the middle shaft tube can be both connected with the tripod head, so that the applicability of the tripod is further improved.

The following describes the storage principle of the first to n-th supporting feet in the specific embodiment briefly.

Figure 23A:
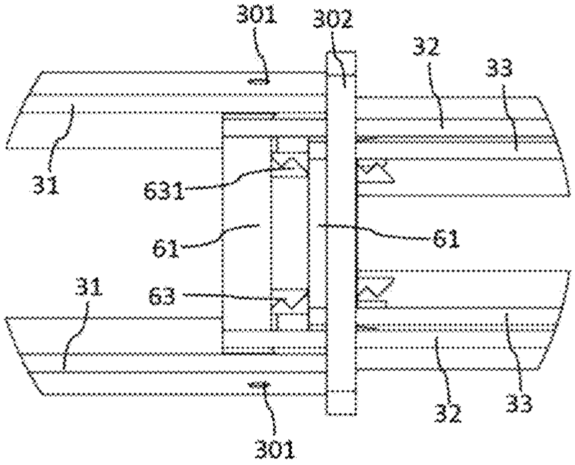
FIG. 23A is a structural schematic diagram before the supporting foot is stored and unlocked in the present disclosure.
Figure 23B:
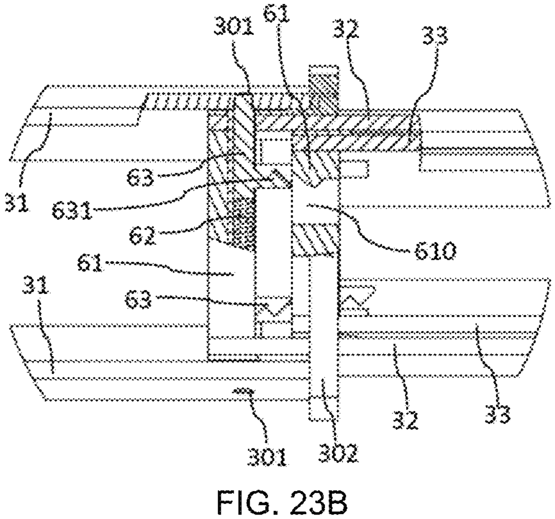
FIG. 23B is a part sectioned view before the supporting foot is stored and unlocked in the present disclosure.
Figure 24A:
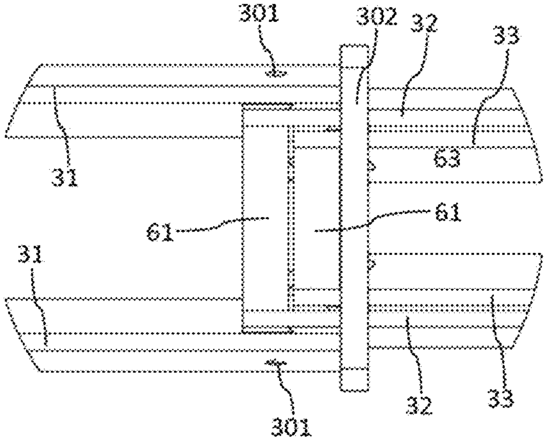
FIG. 24A is a structural schematic diagram after the supporting foot is stored and unlocked in the present disclosure.
Figure 24B:
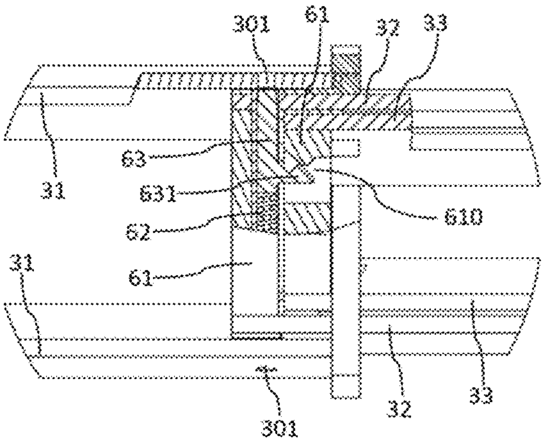
FIG. 24B is a part sectioned view after the supporting foot is stored and unlocked in the present disclosure.

As shown in FIG. 29 to FIG. 34, the first to n-th supporting feet in the specific embodiment can be completely unfolded, and also can be partially unfolded. During storage, the backmost supporting foot starts to be stored, and then other supporting feet are stored one by one inwards. The first to (n-1)-th supporting feet are unlocked by the unlocking hole 610 formed in the unlocking block 611 on the n-th supporting foot and the unlocking holes 610 in the base 61 at the head ends of the second to (n-1)-th supporting feet in sequence respectively. The unlocking principles of the supporting feet are the same. How to unlock the head end of the second supporting foot and the tail end of the first supporting foot in the fixed state by the unlocking hole 610 in the third supporting foot during storage is illustrated only herein. As shown in FIG. 23A and FIG. 238, when the third supporting foot is about to be stored to the bottom, a bevel edge of the unlocking hole 610 on the third supporting foot and a bevel edge of the fixture block 631 on the second supporting foot make contact with each other. As the third supporting foot is further stored inward, through interaction force of the bevel edge of the unlocking hole 610 in the third supporting foot and the bevel edge of the fixture block 631 on the second supporting foot, the locating shaft 63 on the second supporting foot moves inward along the axial direction and is gradually disengaged from the locating hole 301 in the tail end of the first supporting foot. As shown in FIG. 24A and FIG. 248, when the third supporting foot is further stored inward, the locating shaft 63 on the second supporting foot is completely disengaged from the locating hole 301 in the tail end of the first supporting foot. At this time, the second supporting foot can be stored towards the interior of the first supporting foot. Those skilled in the art can easily understand that, for ease of description, the functions of the limit hole 101 in the tail end of the supporting leg 1 and the limit holes 301 in the tail end of the first to (n-2)-th supporting feet are exactly the same, so the unlocking principles are also the same.

In order to save limited space, as shown in FIG. 28B and FIG. 28C, the transverse sections of the first to (n-2)-th supporting feet are in the shape of a "bracket". That is, the first to (n-2)-th supporting feet consist of a pair of supports with the transverse sections in the shape of a "bracket". The upper and lower parts of the "bracket" are open, so all "brackets" with the transverse sections in the shape of a "bracket" of the first to (n-2)-th supporting feet are the same in heights. That is, the heights of the "brackets" do not need to be decreased layer by layer like the diameter of the circular sleeve, so the strength of each supporting foot can be ensured to the maximum extent. In addition, the height refers to the height of a single "bracket". The widths on both sides of the first to (n-2)-th supporting feet are decreased layer by layer, so two adjacent supporting feet can be embedded together. The (n-1)-th supporting foot is tubular, but the transverse sections on both sides of the (n-1)-th supporting foot are still in the shape of a "bracket". Thus, the strength of the (n-1)-th supporting foot can be enhanced. Those skilled in the art easily understand that the transverse section of the (n-1)-th supporting foot may also be directly in the shape of a "bracket", or that both the (n-2)-th supporting foot and the (n-1)-th supporting foot are tubular, or even any other supporting foot may be tubular or the supporting foot apart from another supporting foot may be tubular, but the strengths and space saving degrees of the supporting feet are different, and these two types of supporting feet may be combined in various ways. Examples are not given here one by one.

In the specific embodiment, n is equal to 5, so the n-th supporting foot is the fifth supporting foot, the (n-1)-th supporting foot is the fourth supporting foot, and the (n-2)-th supporting foot is the third supporting foot. The reason why n is expressed in the present disclosure is that the number of supporting feet can be combined in various ways, the n-th supporting foot is the last supporting foot, and the (n-1)-th supporting foot is the penultimate supporting foot, so that the expression is very convenient. It should be understood that if n is equal to 3, the expression of the first to (n-2)-th supporting feet actually indicates the first supporting foot, and the expression of the second to (n-1)-th supporting feet actually indicates the second supporting foot. In addition, under the description, one end, close to the connecting assembly 2, of each of all supporting legs 1 and all supporting feet 3 is called as a head end, and the other ends are called as tail ends.

Embodiment II

The main difference between the second embodiment and the first embodiment lies in that n supporting feet 3 are embedded into the supporting leg in sequence, and n is equal to 2. That is, two supporting feet 3 are embedded into the supporting leg 1 in sequence. Here, for ease of the description of the relationship between the supporting leg 1 and the internal supporting feet 3, "n" is used to express the number of the supporting feet 3. In order to simplify the space, the second embodiment shares the attached figures with a specific embodiment in which n is equal to 5 described in the first embodiment, and the shared attached figures are described as follows.

The supporting leg 1 in the second embodiment is the same as the supporting leg 1 in the first embodiment.

The first supporting foot in the second embodiment is the same as the fourth supporting foot in the first embodiment.

The second supporting foot in the second embodiment is the same as the fifth supporting foot in the first embodiment.

The first to third supporting feet in one specific embodiment in which n is equal to n in the first embodiment are omitted, so that the portable tripod in the second embodiment is formed. Therefore, the portable tripod in the second embodiment is smaller and lighter, so that the portable tripod is mainly suitable for mobile photography.

As shown in FIG. 13, a limit hole 101 is formed in a tail end of the supporting leg 1. As shown in FIG. 17A, FIG. 178, FIG. 17C and FIG. 17D, a head end of the first supporting foot is provided with a locating hole 601 and a locating device 6 respectively. The locating device 6 includes a base 61, a locating spring 62, locating shafts 63 and a locating rail 64. The locating rail 64 is mounted in the base 61 and coaxial to the locating hole 601. The locating spring 62 is arranged at the middle part inside the locating rail 64. The locating shafts 63 are arranged on both sides of the locating spring 62 respectively. The locating shaft 63 can move on the locating rail 64 and is coaxial to the locating hole 601. The middle part of the locating shaft 63 is provided with a protruding fixture block 631.

When the first supporting foot is stretched, the locating shaft 63 of the first supporting foot enters into the limit hole 101 in the tail end of the supporting foot under the effect of the locating spring 62. At this time, the locating shaft 63 of the first supporting foot gets stuck by the limit hole 101 in the tail end of the supporting leg. The first supporting foot is fixed and cannot be stretched again. A tail end of the first supporting foot is provided with a limit ring 303. The limit ring 303 can prevent the head end of the n-th supporting foot from being separated from the tail end of the (n-1)-th supporting foot. A head end of the n-th supporting foot is provided with an unlocking block 611. An unlocking hole 610 is formed in the unlocking block 611. The unlocking hole 610 in the unlocking block 611 is suitably matched with the protruding fixture block 631 at the middle part of the locating shaft 63 at the head end of the (n-1)-th supporting foot.

As shown in FIG. 19, FIG. 20A, FIG. 208, FIG. 21 and FIG. 22, the n-th supporting foot is provided with a fastening device 8, and the fastening device 8 is suitably matched with an inner wall of the (n-1)-th supporting foot. That is, the n-th supporting foot can be tightly fixed together with the inner wall at any position of the (n-1)-th supporting foot through the fastening device 8. A tail end of the n-th supporting foot is provided with a foot cap 351.

Further, as shown in FIG. 19, FIG. 20A, FIG. 208, FIG. 21 and FIG. 22, the fastening device 8 includes a fastening shaft 81, a fastening spring 82 and a fastening head 83, the middle part of the fastening shaft 81 is provided with a protruding clamp ring 811. One end of the fastening head 83 is convexly provided with two elastic clamping pieces 831. A circular hole 830 is formed coaxially with the fastening head 83. A circular hole 612 is formed coaxially with the unlocking hole 611.

The n-th supporting foot is embedded into the fastening shaft 81, and the fastening shaft 81 can move and rotate inside the n-th supporting foot. The foot cap 351 is fixedly connected with one end of the fastening shaft 81. The other end of the fastening head 83 is fixedly connected with a head end of the n-th supporting foot. The other end of the fastening shaft 81 is rotatably connected with the circular hole 612 in the center of the unlocking block 611. The fastening spring 82 is embedded into the fastening shaft 81.

One end of the fastening spring 82 is fixed to the protruding clamp ring 811, and the other end of the fastening spring 82 is fixed to the other end of the fastening head 83. The fastening spring 82 is always in a stretched state. The outer side of the unlocking block 611 is slidably matched with the two elastic clamping pieces 831. As shown in FIG. 20A, when the outer side of the unlocking block 611 slides to tail ends of the two elastic clamping pieces 831, the elastic clamping pieces 831 are fastened and extruded with the inner wall of the (n-1)-th supporting foot. That is, the n-th supporting foot is fixed without moving at this time. As shown in FIG. 208, when the outer side of the unlocking block 611 slides to head ends of the two elastic clamping pieces 831, the elastic clamping pieces 831 can slide with the inner wall of the (n-1)-th supporting foot easily. Thus, the movement of the n-th supporting foot at any position on the inner wall of the (n-1)-th supporting foot is realized. That is to say, the n-th supporting foot and the (n-1)-th supporting foot can be adjusted at different supporting heights, so that the applicability of the tripod is improved.

Of course, there are still many ways to realize the movement of the n-th supporting foot at any position on the inner wall of the (n-1)-th supporting foot. For example, the fastening device 8 of the n-th supporting foot can be directly realized by designing the n-th supporting foot as a slightly elliptical tube body and arranging a slightly elliptical limit ring 303 at the tail end of the (n-1)-th supporting foot. The slightly elliptical tube body of the n-th supporting foot and the slightly elliptical limit ring 303 of the (n-1)-th supporting foot can rotate left and right to complete locking fastening fit or unlocking sliding fit. In order to complete unlocking for the (n-1)-th supporting foot, a circular hole 612 is formed coaxially with the unlocking block 612, and the head end of the n-th supporting foot is rotatably connected with the circular hole 612 in the center of the unlocking block.

Further, as shown in FIG. 19, the foot cap 351 is internally provided with a clamping bulge 3510. A groove 350 is formed in the tail end of the n-th supporting foot. The fastening spring 82 is always in a stretched state. When the outer side of the unlocking block 611 slides to the tail ends of the two elastic clamping pieces 831, the clamping bulge 3510 is in tight fit with the groove 350 in the tail end of the n-th supporting foot. At this time, under the tensile force that the fastening spring 82 is stretched, the unlocking block 611 always stays at the tail ends of the two elastic clamping pieces 831 to realize that the n-th supporting foot is fixed without moving for a long time. When the n-th supporting foot needs to move, the outer side of the unlocking block 611 slides to the head ends of the two elastic clamping pieces 831, and the clamping bulge 3510 inside the foot cap 351 is disengaged from the groove 350 in the tail end of the n-th supporting foot outwards and gets away from an opening of the groove rotatably at the same time. At this time, the clamping bulge 3510 inside the foot cap 351 is jacked a tail end port of the n-th supporting foot. At this time, the n-th supporting foot can easily move to any required position. When the n-th supporting foot moves to another position, the foot cap 351 is rotated again so that the clamping bulge 3510 inside the foot cap aligns to the opening of the groove 350 at the tail end of the n-th supporting foot. And then, the hand is loosened, and the clamping bulge 3510 inside the foot cap is in tight fit with the groove 350 in the tail end of the n-th supporting foot under the effect of the fastening spring 82, so that long-time fixation at another position is realized.

In one specific embodiment, the (n-1)-th supporting foot is tubular. Those skilled in the art easily understand that the transverse section of the (n-1)-th supporting foot may also be in the shape of a "bracket" directly.

The telescoping principle of the supporting leg 1 and the first to n-th supporting feet in the second embodiment is similar to that in the first embodiment, and is not described in detail any more.

In the specific embodiment, n is equal to 2, so the n-th supporting foot is the second supporting foot, and the (n-1)-th supporting foot is the first supporting foot. The reason why n is expressed in the present disclosure is that the expression is very convenient. In addition, under the description, one end, close to the connecting assembly 2, of each of all supporting legs 1 and all supporting feet 3 is called as a head end, and the other ends are called as tail ends.

Embodiment III

The main difference between the third embodiment and the first embodiment lies in that n supporting feet 3 are embedded into the supporting leg in sequence, and n is equal to 1. That is, one supporting foot 3 is embedded into the supporting leg 1. Here, for ease of the description of the relationship between the supporting leg 1 and the internal supporting feet 3, "n" is used to express the number of the supporting feet 3. In order to simplify the space, the third embodiment shares the attached figures with a specific embodiment in which n is equal to 5 described in the first embodiment, and the shared attached figures are described as follows.

The supporting leg 1 in the third embodiment is the same as the supporting leg 1 in the first embodiment.

The n-th supporting foot in the third embodiment, namely the first supporting foot, is the same as the fifth supporting foot in the first embodiment.

The first to fourth supporting feet in one specific embodiment in which n is equal to n in the first embodiment are omitted, so that the portable tripod in the second embodiment is formed. Therefore, the portable tripod in the second embodiment is smaller and lighter, so that the portable tripod is mainly suitable for mobile photography.

As shown in FIG. 20A and FIG. 208, a limit hole 303 is formed in a tail end of the supporting leg 1. The n-th supporting foot is provided with a fastening device 8, and the fastening device 8 is suitably matched with an inner wall of the supporting leg 1. A tail end of the n-th supporting foot is provided with a foot cap 351.

Further, as shown in FIG. 19, FIG. 20A, FIG. 208, FIG. 21 and FIG. 22, the fastening device 8 includes a fastening shaft 81, a fastening spring 82 and a fastening head 83, the middle part of the fastening shaft 81 is provided with a protruding clamp ring 811. One end of the fastening head 83 is convexly provided with two elastic clamping pieces 831. A circular hole 830 is formed coaxially with the fastening head 83. A circular hole 612 is formed coaxially with the unlocking hole 611.

The n-th supporting foot is embedded into the fastening shaft 81, and the fastening shaft 81 can move and rotate inside the n-th supporting foot. The foot cap 351 is fixedly connected with one end of the fastening shaft 81. The other end of the fastening head 83 is fixedly connected with a head end of the n-th supporting foot. The other end of the fastening shaft 81 is rotatably connected with the circular hole 612 in the center of the unlocking block 611. The fastening spring 82 is embedded into the fastening shaft 81. One end of the fastening spring 82 is fixed to the protruding clamp ring 811, and the other end of the fastening spring 82 is fixed to the other end of the fastening head 83. The fastening spring 82 is always in a stretched state. The outer side of the unlocking block 611 is slidably matched with the two elastic clamping pieces 831. As shown in FIG. 20A, when the outer side of the unlocking block 611 slides to tail ends of the two elastic clamping pieces 831, the elastic clamping pieces 831 are fastened and extruded with the inner wall of the supporting leg 1. That is, the n-th supporting foot is fixed without moving at this time. As shown in FIG. 208, when the outer side of the unlocking block 611 slides to head ends of the two elastic clamping pieces 831, the elastic clamping pieces 831 can slide with the inner wall of the supporting leg 1 easily. Thus, the movement of the n-th supporting foot at any position on the inner wall of the supporting leg 1 is realized. That is to say, the n-th supporting foot and the supporting leg 1 can be adjusted at different supporting heights, so that the applicability of the tripod is improved.

Of course, there are still many ways to realize the movement of the n-th supporting foot at any position on the inner wall of the supporting leg 1. For example, the fastening device 8 of the n-th supporting foot can be directly realized by designing the n-th supporting foot as a slightly elliptical tube body and arranging a slightly elliptical limit ring 303 at the tail end of the supporting leg 1. The slightly elliptical tube body of the n-th supporting foot and the slightly elliptical limit ring 303 of the (n-1)-th supporting foot can rotate left and right to complete locking fastening fit or unlocking sliding fit.

Further, as shown in FIG. 19, the foot cap 351 is internally provided with a clamping bulge 3510. A groove 350 is formed in the tail end of the n-th supporting foot. The fastening spring 82 is always in a stretched state. When the outer side of the unlocking block 611 slides to the tail ends of the two elastic clamping pieces 831, the clamping bulge 3510 is in tight fit with the groove 350 in the tail end of the n-th supporting foot. At this time, under the tensile force that the fastening spring 82 is stretched, the unlocking block 611 always stays at the tail ends of the two elastic clamping pieces 831 to realize that the n-th supporting foot is fixed without moving for a long time. When the n-th supporting foot needs to move, the outer side of the unlocking block 611 slides to the head ends of the two elastic clamping pieces 831, and the clamping bulge 3510 inside the foot cap 351 is disengaged from the groove 350 in the tail end of the n-th supporting foot outwards and gets away from an opening of the groove rotatably at the same time. At this time, the clamping bulge 3510 inside the foot cap 351 is jacked a tail end port of the n-th supporting foot. At this time, the n-th supporting foot can easily move to any required position. When the n-th supporting foot moves to another position, the foot cap 351 is rotated again so that the clamping bulge 3510 inside the foot cap aligns to the opening of the groove 350 at the tail end of the n-th supporting foot. And then, the hand is loosened, and the clamping bulge 3510 inside the foot cap is in tight fit with the groove 350 in the tail end of the n-th supporting foot under the effect of the fastening spring 82, so that long-time fixation at another position is realized.

Embodiment IV

On the structural basis of the portable tripod in the first embodiment, the portable tripod provided by the fourth embodiment also includes a locating hole guide system. The locating hole guide system is arranged in the supporting legs and the first to (n-1)-th supporting feet embedded into the supporting legs in sequence, and when the first to (n-1)-th supporting feet are stretched, the locating hole guide system respectively guides the locating shaft 63 to enter into the limit hole 101 and/or the limit hole 301 under the effect of the locating spring 62. In the embodiment, the locating hole guide system can prevent the locating shaft 63 from deviating from the limit hole 101 and/or the limit hole 301 due to no alignment when the first to (n-1)-th supporting feet are stretched.

In one of further schemes, as shown in FIG. 4, FIG. 17D, FIG. 18 and FIG. 19, the locating hole guide system includes groove plates 72 and bulge plates 71. The groove plates 72 are respectively embedded and fixed into both sides of the tail end of the supporting leg 1 and both sides of the tail ends of the first to (n-2)-th supporting feet, and a groove of the groove plate 72 faces towards the connecting assembly 2. The bulge plates 71 are respectively fixedly mounted on both sides of the bases 61 of the locating devices 6 in the first to (n-1)-th supporting feet, and a bulge of the bulge plate 71 faces towards the foot cap 351. When the first to (n-1)-th supporting feet are stretched, the bulge plates 71 of the first to (n-1)-th supporting feet are respectively matched with the groove plates 72 of the first to (n-2)-th supporting feet and guide the corresponding locating shaft 63 to enter into the corresponding limit hole 101 and/or the limit hole 301 under the effect of the corresponding locating spring 62. For example, when the first supporting foot is stretched, the bulge plate 71 of the first supporting foot is matched with the groove plate 72 of the supporting leg 1 and guides the locating shaft 63 of the first supporting foot to enter into the limit hole 101 of the supporting leg 1 under the effect of the locating spring 62. When the second supporting foot is stretched, the bulge plate 71 of the second supporting foot is matched with the groove plate 72 of the first supporting foot and guides the locating shaft 63 of the second supporting foot to enter into the limit hole 301 of the first supporting foot under the effect of the locating spring 62. The rest may be deduced by analogy.

Figure 35:
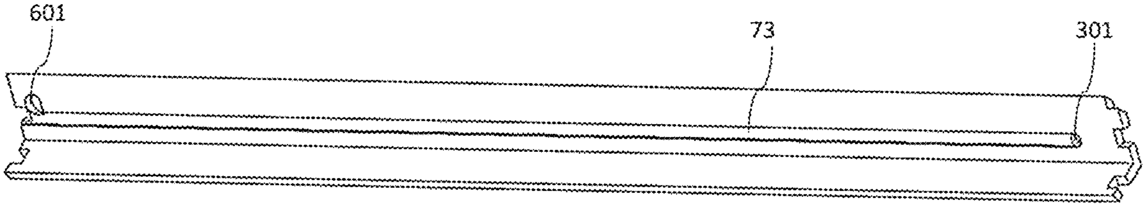
FIG. 35 is a structural schematic diagram of a locating hole guide system of the portable tripod in the present disclosure.

In another further scheme, as shown in FIG. 35, the locating hole guide system includes rail slots 73. The rail slots 73 are respectively formed in both sides of the supporting leg 1 and both inner sides of the first to (n-2)-th supporting feet. One end of each of the rail slots 73 is respectively ended at the limit holes 101 in both sides of the tail end of the supporting leg and the limit holes 301 in both sides of the tail ends of the first to (n-2)-th supporting feet, and the other ends of the rail slots 73 are respectively ended at both sides of the head end of the supporting leg and both sides of the head ends of the first to (n-2)-th supporting feet. When the first to (n-1)-th supporting feet are stretched, the locating shafts of the first to (n-1)-th supporting feet reach and enter into the corresponding limit hole 101 and/or limit hole 301 under the guide of the rail slot 73 and the effect of the locating spring 62. For example, When the first supporting foot is stretched, the locating shaft 63 of the first supporting foot reaches and enters into the limit holes 101 in both sides of the supporting leg 1 under the guide of the rail slot 73 and the effect of the locating spring 62. When the second supporting foot is stretched, the locating shaft of the second supporting foot reaches and enters into the limit hole 101 of the first supporting foot under the guide of the rail slot 73 and the effect of the locating spring 62. The rest may be deduced by analogy.

Of course, the locating hole guide system in the fourth embodiment may also be a combination of the two further schemes. That is, the locating hole guide system includes the two further schemes at the same time.

Embodiment V

On the structural basis of the portable tripod in the second embodiment, the portable tripod provided by the fifth embodiment also includes a locating hole guide system. The locating hole guide system is arranged in the supporting legs and the first to (n-1)-th supporting feet embedded into the supporting legs in sequence. When the first supporting foot is stretched, the locating hole guide system guides the locating shaft 63 to enter into the limit hole 101 under the effect of the locating spring 62. In the embodiment, the locating hole guide system can prevent the locating shaft 63 from deviating from the limit hole 101 due to no alignment when the first supporting foot is stretched.

In one of further schemes, as shown in FIG. 4 and FIG. 19, the locating hole guide system includes groove plates 72 and bulge plates 71. The groove plates 72 are respectively embedded and fixed into both sides of the tail end of the supporting leg 1, and a groove of the groove plate 72 faces towards the connecting assembly 2. The bulge plates 71 are respectively fixedly mounted on both sides of the base 61 of the locating device 6 in the first supporting foot, and a bulge of the bulge plate 72 faces towards the foot cap 351. When the first supporting foot is stretched, the bulge plate 71 of the first supporting foot is matched with the groove plate 72 of the supporting leg 1 and guides the corresponding locating shaft 63 to enter into the corresponding hole 101 under the effect of the locating spring 62.

In another further scheme, as shown in FIG. 35, the locating hole guide system includes rail slots 73. The rail slots 73 are formed in both sides of the supporting leg 1. One end of each of the rail slots 73 is respectively ended at the limit holes 101 in both sides of the tail end of the supporting leg 1, and the other ends of the rail slots 73 are respectively ended at both sides of the head end of the supporting leg 1. When the first supporting foot is stretched, the locating shaft of the first supporting foot reaches and enters into the corresponding limit hole 101 under the guide of the rail slot 73 and the effect of the locating spring 62.

Of course, the locating hole guide system in the fifth embodiment may also be a combination of the two further schemes. That is, the locating hole guide system includes the two further schemes at the same time.

The invention claimed is:

1. A portable tripod, comprising:

a connecting assembly;

three supporting legs, wherein a head end of the supporting leg is rotatably connected with the connecting assembly, at least one supporting foot is embedded into each of the three supporting legs, and the three supporting legs and the supporting feet respectively in the supporting legs can be folded inwards to form a compact hollow cylinder; and a middle shaft tube, wherein the middle shaft tube is embedded into the connecting assembly, and the three supporting legs and the supporting feet respectively in the supporting legs can be folded inwards to allow the middle shaft tube to compactly combine with each other for the formation of the compact hollow cylinder, wherein n supporting feet are embedded into the supporting leg in sequence, and n is a positive integer of larger than or equal to 3; a limit hole is formed in a tail end of the supporting leg; head ends of the first to (n-1)-th supporting feet are provided with a locating hole and a locating device respectively, the locating device comprises a base, a locating spring, locating shafts and a locating rail, the locating rail is mounted in the base and coaxial to the locating hole, the locating spring is arranged around the midpoint inside the locating rail, the locating shafts are arranged on both sides of the locating spring respectively, the locating shaft can move on the locating rail and is coaxial to the locating hole, and around the midpoint of the locating shaft is provided with a protruding fixture block; tail ends of the first to (n-2)-th supporting feet are provided with a limit hole and a fixed ring respectively, and the fixed rings are fixedly mounted at the tail ends of the first to (n-2)-th supporting feet; when the first supporting foot is stretched, the locating shaft of the first supporting foot enters into the limit hole in the tail end of the supporting foot under the effect of the locating spring; when the second to (n-1)-th supporting feet are stretched, the corresponding locating shaft enters into the corresponding locating hole under the effect of the locating spring; a tail end of the (n-1)-th supporting foot is provided with a limit ring; an unlocking hole is formed in the base at head ends of the second to (n-1)-th supporting feet, and the unlocking holes in the bases at the head ends of the second to (n-1)-th supporting feet are matched with the protruding fixture blocks around the midpoint of the locating shafts at the head ends of the first to (n-2)-th supporting feet respectively; a head end of the n-th supporting foot is provided with an unlocking block, an unlocking hole is formed in the unlocking block, and the unlocking hole in the unlocking block is suitably matched with the protruding fixture block around the midpoint of the locating shaft at the head end of the (n-1)-th supporting foot; the transverse sections of the first to (n-2)-th supporting feet are in a shape of "( )", a shape of "< >" or other similar variants; the n-th supporting foot is provided with a fastening device, and the fastening device is suitably matched with an inner wall of the (n-1)-th supporting foot; and a tail end of the n-th supporting foot is provided with a foot cap.

2. The portable tripod according to claim 1, wherein the middle shaft tube of the supporting leg is in the shape of a ⅓ hollow ring.

3. The portable tripod according to claim 1, wherein the supporting leg comprises a pair of side walls, an upper arc-shaped wall and a lower arc-shaped wall, and the pair of side walls, the upper arc-shaped wall and the lower arc-shaped wall are encircled to form an annular tube body.

4. The portable tripod according to claim 3, wherein side walls of the supporting leg comprise an upper side wall and a lower side wall, and each pair of side walls are encircled in pairs in opposite directions to form a shape of "( )", a shape of "< >" or other similar variants.

5. The portable tripod according to claim 1, wherein the connecting assembly comprises a connecting base, a locking knob and a locking ring, the connecting base is internally in the shape of a circular ring, three outward protruding base heads and at least one locking threaded hole are arranged outside the connecting base, the locking threaded hole is in threaded connection with the locking knob, and the locking ring is coaxial to the connecting base; and the head end of the supporting leg comprises a connector, and the connector is rotatably connected with the base head.

6. The portable tripod according to claim 4, also comprising a support fixing device, the support fixing device comprises three pairs of support rails, three pairs of support rods and support connectors, the three pairs of support rails are mounted at lower ends of the two upper side walls of the three supporting legs respectively, the three pairs of support rods are slidably mounted on the three pairs of support rails respectively, at least one end of the support rod is not separated from the support rail, and the other ends of the three pairs of support rods are rotatably mounted on the support connectors respectively.

7. The portable tripod according to claim 6, wherein a cylindrical cavity is formed inside of the support rail, a strip opening with a width of smaller than the diameter of the cylindrical cavity is formed outside of the support rail, and the strip opening is suitably matched with the support rod.

8. The portable tripod according to claim 6, wherein the support connector comprises a support tray and three claws, the three claws are arranged outside the support tray, every two claws has an included angle of 120 degrees, two openings with an included angle of 120 degrees are formed in a tail end of the claw, a spherical cavity is formed inside of the opening, protruding balls are arranged at both ends of the support rod, and the spherical cavity is suitably rotatably connected with the protruding ball at the other end of the support rod.

9. The portable tripod according to claim 8, wherein the support connector also comprises a support shaft, a hollow hole is formed coaxially with the support tray, an upper end of the support shaft is of a screw structure, the upper end of the support shaft is in threaded connection with a lower end of the middle shaft tube, around the of the support shaft is rotatably connected with the hollow hole formed coaxially with the support tray, a lower end of the support shaft is provided with a clamping shaft and a round top, and the lower end of the support shaft can be connected with a mounting hole beneath a tripod head through the clamping shaft and the round top.

10. The portable tripod according to claim 1, wherein at least one middle shaft sleeve sleeves the middle shaft tube internally, the middle shaft tube and the middle shaft sleeve are adjacent in pairs and telescopically connected, a threaded hole is formed in a lower end of the middle shaft sleeve, an upper end innermost of the middle shaft sleeve is provided with a clamping shaft and a round top, and innermost of the middle shaft sleeve is connected with a mounting hole beneath a tripod head through the clamping shaft and the round top.

11. The portable tripod according to claim 1, wherein n supporting feet are embedded into the supporting leg, and n is equal to 1; a tail end of the supporting leg is provided with a limit ring; the n-th supporting foot is provided with a fastening device, and the fastening device is suitably matched with an inner wall of the supporting leg; and a tail end of the n-th supporting foot is provided with a foot cap.

12. The portable tripod according to claim 1, wherein the fastening device comprises a fastening shaft, a fastening spring and a fastening head, around the midpoint the fastening shaft is provided with a protruding clamp ring, one end of the fastening head is convexly provided with two elastic clamping pieces, a circular hole is formed coaxially with the fastening head, and a circular hole is formed coaxially with the unlocking hole; the n-th supporting foot is embedded into the fastening shaft, the fastening shaft can move and rotate inside the n-th supporting foot, the foot cap is fixedly connected with one end of the fastening shaft, the other end of the fastening head is fixedly connected with a head end of the n-th supporting foot, the other end of the fastening shaft is rotatably connected with the circular hole in the center of the unlocking block, the fastening spring is embedded into the fastening shaft, one end of the fastening spring is fixed to the protruding clamp ring, the other end of the fastening spring is fixed to the other end of the fastening head, outside of the unlocking block is slidably matched with the two elastic clamping pieces, when outside of the unlocking block slides to tail ends of the two elastic clamping pieces, the elastic clamping pieces are fastened and extruded with the inner wall of the (n-1)-th supporting foot, and when outside of the unlocking block slides to head ends of the two elastic clamping pieces, the elastic clamping pieces can slide with the inner wall of the (n-1)-th supporting foot easily.

13. The portable tripod according to claim 1, wherein a circular hole is formed coaxially with the unlocking block, the head end of the n-th supporting foot is rotatably connected with the circular hole in the center of the unlocking block, the fastening device comprises a slightly elliptical tube body of the n-th supporting foot and a slightly elliptical limit ring at the tail end of the (n-1)-th supporting foot, and the slightly elliptical tube body of the n-th supporting foot and the slightly elliptical limit ring arranged at the tail end of the (n-1)-th supporting foot can rotate left and right to complete locking fastening fit or unlocking sliding fit.

14. The portable tripod according to claim 12, wherein the foot cap is internally provided with a clamping bulge, a groove is formed in the tail end of the n-th supporting foot, the fastening spring is always in a stretched state, when the outer side of the unlocking block slides to the tail ends of the two elastic clamping pieces, the clamping bulge is in tight fit with the groove in the tail end of the n-th supporting foot, and when the outer side of the unlocking block slides to the head ends of the two elastic clamping pieces, the clamping bulge inside the foot cap is disengaged from the groove in the tail end of the n-th supporting foot outwards and gets away from an opening of the groove rotatably.

15. The portable tripod according to claim 1, also comprising a locating hole guide system, wherein the locating hole guide system is arranged in the supporting legs and the first to (n-1)-th supporting feet embedded into the supporting legs in sequence, and when the first to (n-1)-th supporting feet are stretched, the locating hole guide system respectively guides the locating shaft to enter into the limit hole under the effect of the locating spring.

16. The portable tripod according to claim 15, wherein the locating hole guide system comprises groove plates and bulge plates; the groove plates are respectively embedded and fixed into both sides of the tail end of the supporting leg and both sides of the tail ends of the first to (n-2)-th supporting feet, and a groove of the groove plate faces towards the connecting assembly; the bulge plates are respectively fixedly mounted on both sides of the bases of the locating devices in the first to (n-1)-th supporting feet, and a bulge of the bulge plate faces towards the foot cap; and when the first to (n-1)-th supporting feet are stretched, the bulge plates of the first to (n-1)-th supporting feet are respectively matched with the groove plates of the first to (n-2)-th supporting feet and guide the corresponding locating shaft to enter into the corresponding limit hole under the effect of the corresponding locating spring.

17. The portable tripod according to claim 15, wherein the locating hole guide system comprises rail slots, the rail slots are respectively formed in both sides of the supporting leg and both inner sides of the first to (n-2)-th supporting feet, one end of each of the rail slots is respectively ended at the limit holes in both sides of the tail end of the supporting leg and the limit holes in both sides of the tail ends of the first to (n-2)-th supporting feet, and the other ends of the rail slots are respectively ended at both sides of the head end of the supporting leg and both sides of the head ends of the first to (n-2)-th supporting feet.

18. The portable tripod according to claim 1, also comprising a locating hole guide system, wherein the locating hole guide system is arranged in the supporting legs and the first supporting foot embedded into the supporting leg in sequence, and when the first supporting foot is stretched, the locating hole guide system guides the locating shaft to enter into the limit hole under the effect of the locating spring.

19. A portable tripod, comprising:

a connecting assembly;

three supporting legs, wherein a head end of the supporting leg is rotatably connected with the connecting assembly, at least one supporting foot is embedded into each of the three supporting legs, and the three supporting legs and the supporting feet respectively in the supporting legs can be folded inwards to form a compact hollow cylinder; and a middle shaft tube, wherein the middle shaft tube is embedded into the connecting assembly, and the three supporting legs and the supporting feet respectively in the supporting legs can be folded inwards to allow the middle shaft tube to compactly combine with each other for the formation of the compact hollow cylinder, wherein n supporting feet are embedded into the supporting leg in sequence, and n is equal to 2; a limit hole is formed in a tail end of the supporting leg; a head end of the first supporting foot is provided with a locating hole and a locating device respectively, the locating device comprises a base, a locating spring, locating shafts and a locating rail, the locating rail is mounted in the base and coaxial to the locating hole, the locating spring is arranged around the midpoint of inside the locating rail, the locating shafts are arranged on both sides of the locating spring respectively, the locating shaft can move on the locating rail and is coaxial to the locating hole, and around the midpoint of the locating shaft is provided with a protruding fixture block; when the first supporting foot is stretched, the locating shaft enters into the limiting hole under the effect of the locating spring; a tail end of the first supporting foot is provided with a limit ring; a head end of the n-th supporting foot is provided with an unlocking block, an unlocking hole is formed in the unlocking block, and the unlocking hole in the unlocking block is suitably matched with the protruding fixture block at around the midpoint of the locating shaft at the head end of the (n-1)-th supporting foot; the n-th supporting foot is provided with a fastening device, and the fastening device is suitably matched with an inner wall of the (n-1)-th supporting foot; and a tail end of the n-th supporting foot is provided with a foot cap.

* * * * *